US012304320B2

(12) United States Patent
Oguro et al.

(10) Patent No.: US 12,304,320 B2
(45) Date of Patent: May 20, 2025

(54) VEHICLE CONTROL APPARATUS

(71) Applicant: SUBARU CORPORATION, Tokyo (JP)

(72) Inventors: Chihiro Oguro, Tokyo (JP); Yoshiyuki Kambe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/927,260

(22) PCT Filed: Jul. 21, 2021

(86) PCT No.: PCT/JP2021/027338
§ 371 (c)(1),
(2) Date: Nov. 22, 2022

(87) PCT Pub. No.: WO2023/002607
PCT Pub. Date: Jan. 26, 2023

(65) Prior Publication Data
US 2025/0074207 A1    Mar. 6, 2025

(51) Int. Cl.
B60L 15/20     (2006.01)
B60L 7/18      (2006.01)
B60T 8/1755    (2006.01)

(52) U.S. Cl.
CPC ............ B60L 15/2009 (2013.01); B60L 7/18 (2013.01); B60T 8/1755 (2013.01);
(Continued)

(58) Field of Classification Search
CPC .............. B60L 3/108; B60L 15/2009; B60L 2240/465; B60L 2260/28; B60T 1/10;
(Continued)

(56) References Cited

U.S. PATENT DOCUMENTS 5,376,868 A * 12/1994 Toyoda ................. B60L 3/0023
                                                         318/587
5,472,265 A * 12/1995 Ohnuma ................ B60L 7/12
                                                         303/3

(Continued)

FOREIGN PATENT DOCUMENTS

JP    2002058107 A  *  2/2002
JP    2005-170086 A    6/2005
(Continued)

OTHER PUBLICATIONS

Mutoh, Nobuyoshi et al., "Driving Characteristics of an Electric Vehicle System With Independently Driven Front and Rear Wheels", IEEE Transactions on Industrial Electronics, vol. 53, No. 3, Jun. 2006, pp. 803 to 813. (Year: 2006).*

(Continued)

Primary Examiner — David A Testardi
(74) Attorney, Agent, or Firm — Rimon P.C.

(57) ABSTRACT

A vehicle control apparatus includes a front-wheel drive system, a rear-wheel drive system, and a control system. The front-wheel drive system includes one or two front-wheel motors coupled to a front wheel. The rear-wheel drive system includes two rear-wheel motors coupled to a rear wheel. The control system controls the front-wheel drive system and the rear-wheel drive system. If a front-wheel slip rate is greater than a start threshold upon coasting, the control system executes a rear-wheel slip suppression control of reducing regenerative torque of each rear-wheel motor toward initial rear-wheel torque. If a yaw rate of the vehicle is greater than a behavior determination threshold after the rear-wheel slip suppression control has been started, the control system executes an attitude stabilization control of controlling the regenerative torque of at least one of the rear-wheel motors and thereby expanding a difference (Continued)

in the regenerative torque between the two rear-wheel motors.

6 Claims, 21 Drawing Sheets

(52) U.S. Cl.
CPC ..... *B60L 2240/22* (2013.01); *B60L 2240/465* (2013.01); *B60L 2240/642* (2013.01); *B60L 2260/28* (2013.01)

(58) Field of Classification Search
CPC ............. B60T 13/586; B60T 2270/602; B60T 2270/608; B60T 2270/611; B60T 8/1755; B60W 30/02
See application file for complete search history.

(56) References Cited

U.S. PATENT DOCUMENTS

| | | | | |
|---|---|---|---|---|
| 6,295,487 | B1* | 9/2001 | Ono | B60W 10/02 701/52 |
| 2002/0036429 | A1* | 3/2002 | Shimada | B60W 10/18 903/947 |
| 2002/0180262 | A1* | 12/2002 | Hara | B60T 8/4081 303/113.1 |
| 2002/0180266 | A1* | 12/2002 | Hara | B60W 30/18109 903/918 |
| 2004/0176899 | A1* | 9/2004 | Hallowell | B60L 15/2036 701/84 |
| 2005/0099146 | A1* | 5/2005 | Nishikawa | B60L 7/18 318/63 |
| 2005/0159871 | A1* | 7/2005 | Nakamura | B60K 6/52 303/121 |
| 2007/0021875 | A1* | 1/2007 | Naik | B60W 30/045 701/72 |
| 2009/0012686 | A1* | 1/2009 | Maeda | B60T 8/1755 701/70 |
| 2012/0143426 | A1* | 6/2012 | Yamamoto | B60K 6/383 903/903 |
| 2012/0271496 | A1* | 10/2012 | Yamamoto | B60K 17/043 180/65.265 |
| 2013/0211644 | A1* | 8/2013 | Yokoyama | B60L 3/102 701/22 |
| 2014/0145498 | A1* | 5/2014 | Yamakado | B60T 8/245 303/3 |
| 2015/0239442 | A1* | 8/2015 | Yamakado | B60T 8/17555 701/70 |
| 2015/0307086 | A1* | 10/2015 | Ketfi-Cherif | B60W 10/08 180/65.265 |
| 2017/0232848 | A1* | 8/2017 | Lian | B60W 30/18172 701/22 |
| 2018/0237001 | A1* | 8/2018 | Lian | B60L 7/10 |
| 2020/0070836 | A1* | 3/2020 | Suzuki | B60L 15/20 |
| 2020/0172109 | A1* | 6/2020 | Son | B60W 30/18127 |
| 2021/0039630 | A1* | 2/2021 | Oh | B60T 8/175 |
| 2021/0237583 | A1* | 8/2021 | Huang | F16D 61/00 |
| 2022/0017092 | A1* | 1/2022 | Kim | B60W 10/192 |

FOREIGN PATENT DOCUMENTS

| | | | |
|---|---|---|---|
| JP | 2005204436 A | * | 7/2005 |
| JP | 2005-349887 A | | 12/2005 |
| JP | 2007282406 A | * | 10/2007 |
| JP | 2016086535 A | * | 5/2016 |
| JP | 2017-46494 A | | 3/2017 |
| JP | 2019017182 A | * | 1/2019 |

OTHER PUBLICATIONS

International Search Report in the corresponding International Application No. PCT/JP2021/027338 dated Aug. 31, 2021, with English Translation (4 pages).

* cited by examiner

FIG. 16
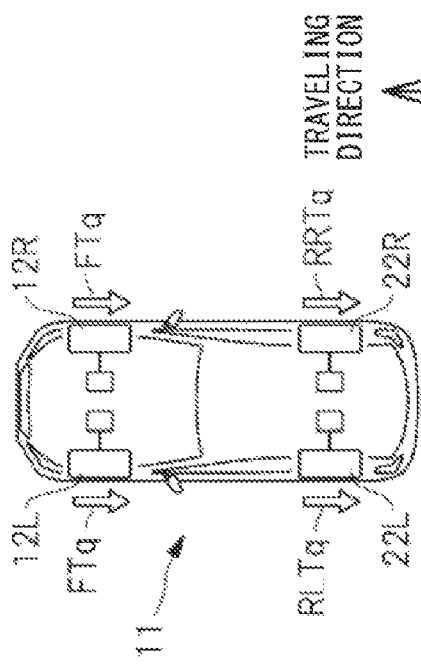
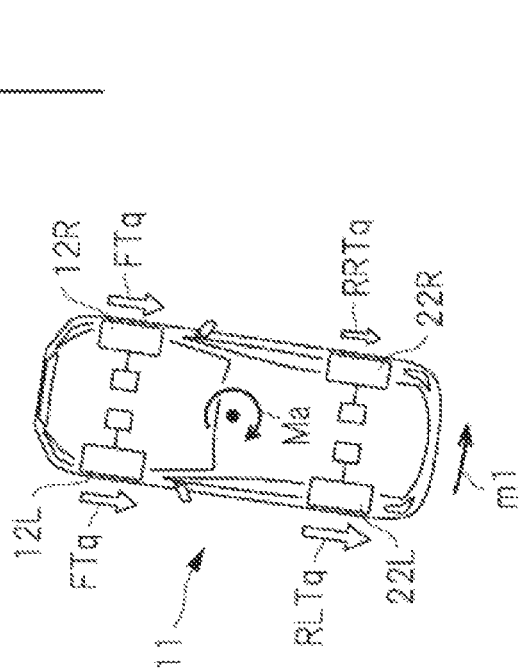

FIG. 18
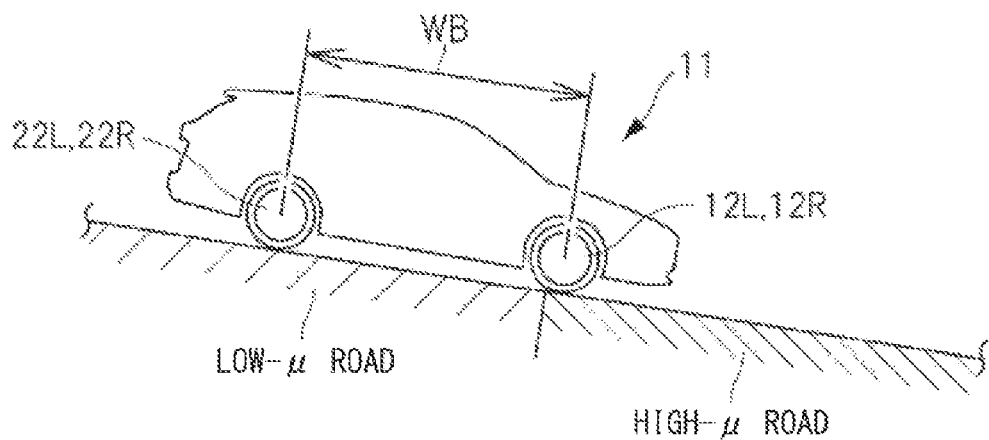
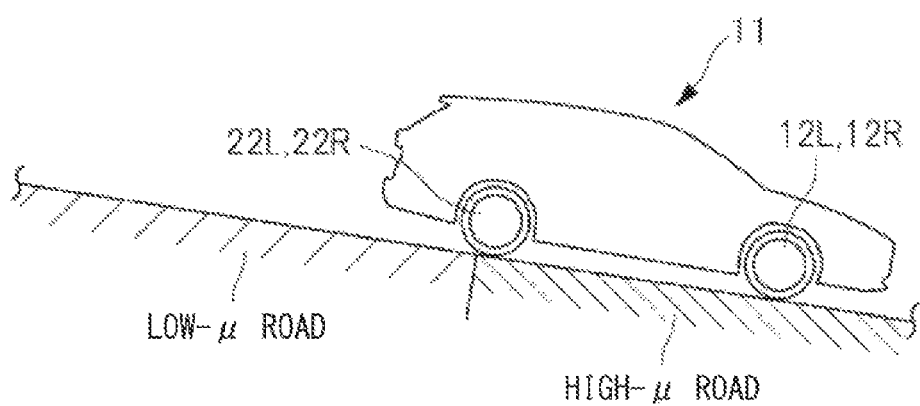

VEHICLE CONTROL APPARATUS

CROSS REFERENCE TO RELATED APPLICATIONS

This application is the U.S. National Phase under 35 U.S.C. § 371 of International Application No. PCT/JP2021/027338, filed on Jul. 21, 2021, the entire contents of each are hereby incorporated by reference.

TECHNICAL FIELD

The invention relates to a vehicle control apparatus to be mounted on a vehicle.

BACKGROUND ART

As a vehicle such as an electric automobile, a vehicle including a plurality of traveling motors has been developed (see Patent Literatures 1 to 3). One example of such a vehicle including the plurality of traveling motors is a vehicle provided with one traveling motor per wheel.

CITATION LIST

Patent Literature

Patent Literature 1: Japanese Unexamined Patent Application Publication No. 2005-170086
Patent Literature 2: Japanese Unexamined Patent Application Publication No. 2005-349887
Patent Literature 3: Japanese Unexamined Patent Application Publication No. 2017-46494

SUMMARY OF INVENTION

Problem to be Solved by the Invention

In general, however, upon coasting in which an acceleration operation and a braking operation are not performed, a plurality of traveling motors are controlled to be in a regenerative state. In this case, on a low-μ road such as a compacted snow road surface or a frozen road surface, a road surface in contact with each wheel often has an uneven friction coefficient. Therefore, a uniform control of the regenerative states of the respective traveling motors has caused a slip of some of the wheels, resulting in an unstable vehicle attitude.

It is an object of the invention to stabilize a vehicle attitude upon coasting.

Means for Solving the Problem

A vehicle control apparatus according to an embodiment is a vehicle control apparatus to be mounted on a vehicle. The vehicle control apparatus includes a front-wheel drive system, a rear-wheel drive system, and a control system. The front-wheel drive system includes one or two front-wheel motors each coupled to a front wheel. The rear-wheel drive system includes two rear-wheel motors each coupled to a rear wheel. The control system includes a processor and a memory communicably coupled to each other. The control system is configured to control the front-wheel drive system and the rear-wheel drive system. In a case where a front-wheel slip rate is greater than a start threshold upon coasting, the control system executes a front-wheel slip suppression control of reducing regenerative torque of each of the one or two front-wheel motors toward initial front-wheel torque. In the case where the front-wheel slip rate is greater than the start threshold upon the coasting, the control system executes a rear-wheel slip suppression control of reducing regenerative torque of each of the rear-wheel motors toward initial rear-wheel torque. In a case where a yaw rate of the vehicle is greater than a behavior determination threshold under a situation in which the rear-wheel slip suppression control has been started, the control system executes an attitude stabilization control of controlling the regenerative torque of at least one of the two rear-wheel motors positioned on left and right and thereby expanding a difference in the regenerative torque between the two rear-wheel motors.

Effects of the Invention

The vehicle control apparatus according to the embodiment executes, in the case where the yaw rate of the vehicle is greater than the behavior determination threshold under the situation in which the rear-wheel slip suppression control has been started, the attitude stabilization control of controlling the regenerative torque of at least one of the two rear-wheel motors positioned on the left and the right and thereby expanding the difference in the regenerative torque between the two rear-wheel motors. This makes it possible to stabilize a vehicle attitude upon coasting.

BRIEF DESCRIPTION OF DRAWINGS

FIG. 16 is a diagram illustrating traveling situations of a vehicle at respective times t3 and t4.

FIG. 18 is a diagram illustrating traveling situations of the vehicle at respective times t5 and t6.

MODES FOR CARRYING OUT THE INVENTION

Figure 1:
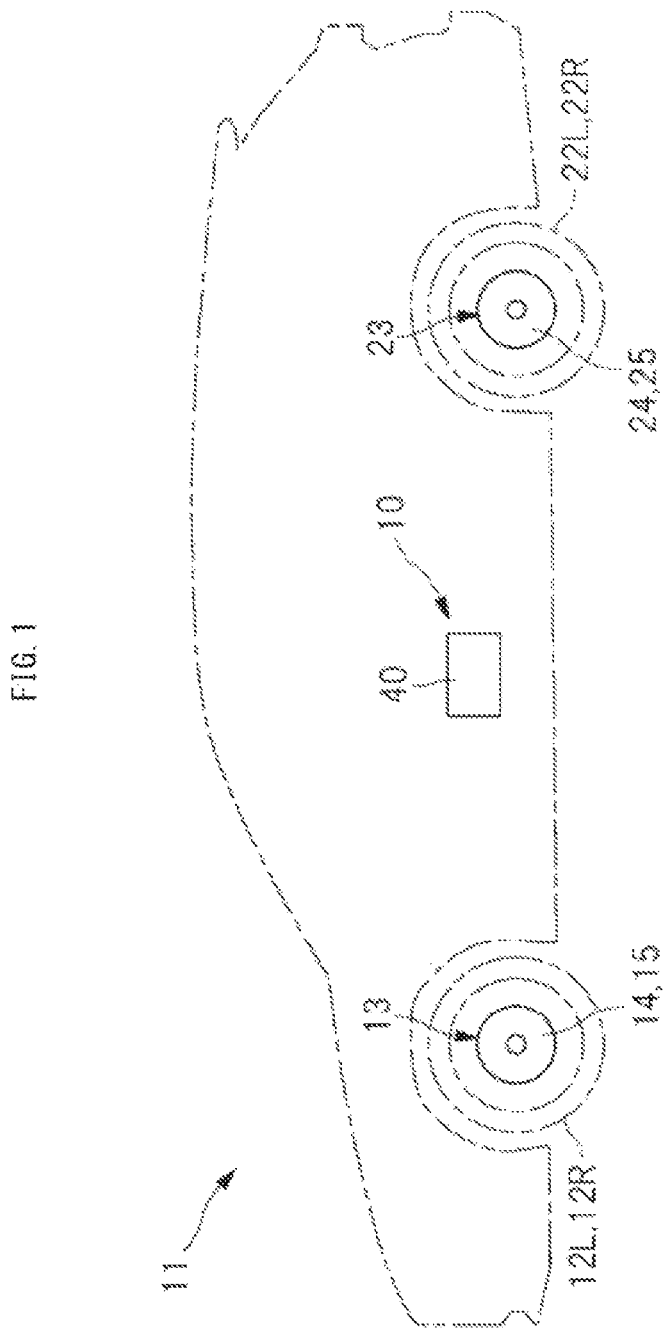
FIG. 1 is a diagram illustrating a configuration example of a vehicle provided with a vehicle control apparatus according to one embodiment of the invention.

In the following, some embodiments of the invention are described in detail with reference to the drawings. It is to be noted that, in the following description, the same or substantially the same configurations or elements are denoted by the same reference numerals to avoid any redundant description.

[Vehicle Configuration]

Figure 2:
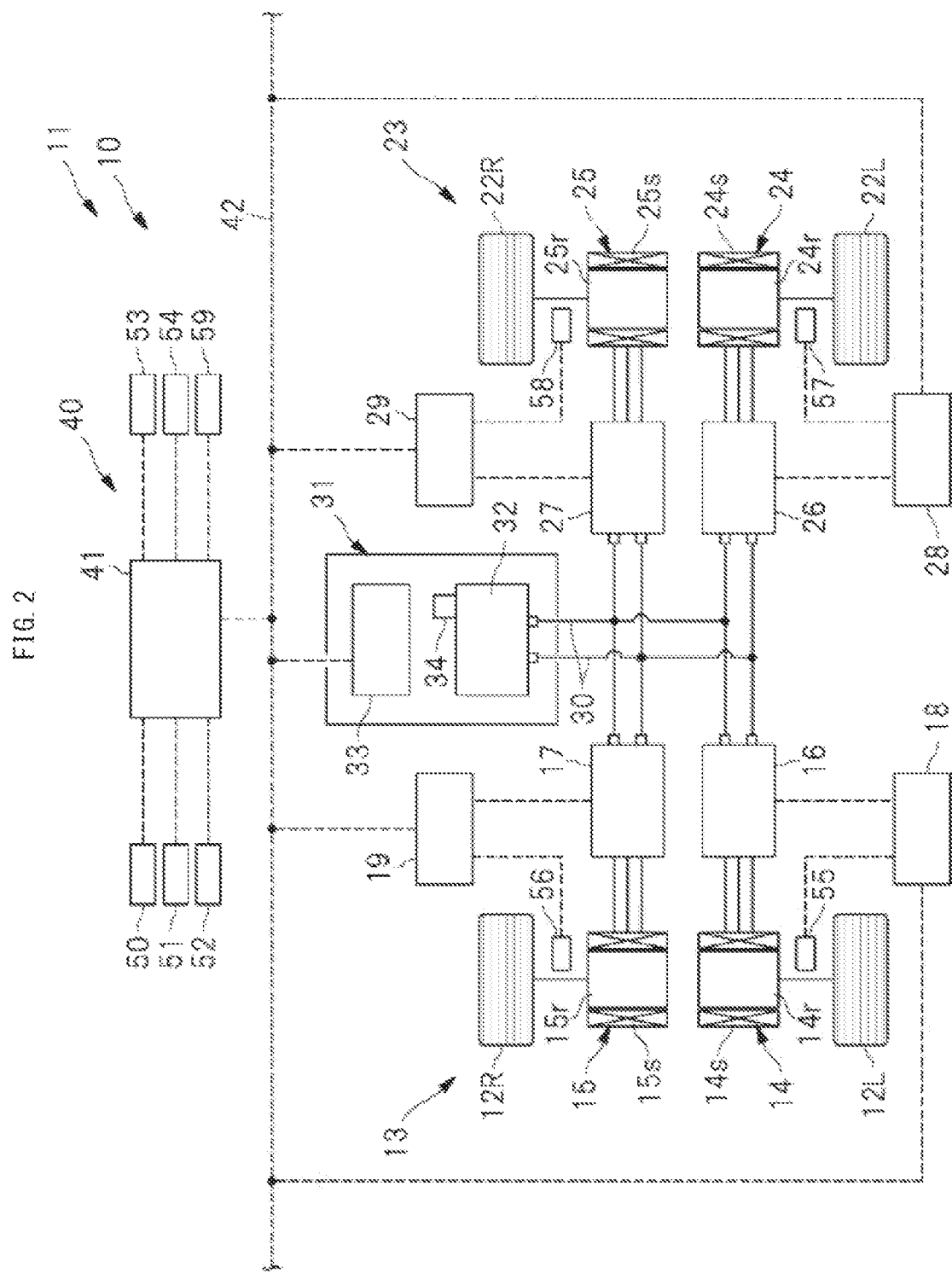
FIG. 2 is a diagram illustrating a configuration example of the vehicle control apparatus.

FIG. 1 is a diagram illustrating a configuration example of a vehicle 11 provided with a vehicle control apparatus 10 according to an embodiment of the invention. FIG. 2 is a diagram illustrating a configuration example of the vehicle control apparatus 10. As illustrated in FIGS. 1 and 2, the vehicle 11 is provided with a front-wheel drive system 13 that drives a left front wheel 12L and a right front wheel 12R, and a rear-wheel drive system 23 that drives a left rear wheel 22L and a right rear wheel 22R. The front-wheel drive system 13 includes a left front motor (a front-wheel motor) 14 coupled to the left front wheel 12L, and a right front motor (a front-wheel motor) 15 coupled to the right front wheel 12R. Further, the rear-wheel drive system 23 includes a left rear motor (a rear-wheel motor) 24 coupled to the left rear wheel 22L, and a right rear motor (a rear-wheel motor) 25 coupled to the right rear wheel 22R. Thus, the vehicle 11 includes the front-wheel drive system 13 including the two front motors 14 and 15 coupled to the front wheels 12L and 12R, and the rear-wheel drive system 23 including the two rear motors 24 and 25 coupled to the rear wheels 22L and 22R.

It is to be noted that, in the illustrated example, a rotor 14r of the left front motor 14 is directly coupled to the left front wheel 12L, and a rotor 15r of the right front motor 15 is directly coupled to the right front wheel 12R; however, this is non-limiting. For example, the left front wheel 12L and the rotor 14r may be coupled to each other via a gear train, and the right front wheel 12R and the rotor 15r may be coupled to each other via a gear train. Similarly, in the illustrated example, a rotor 24r of the left rear motor 24 is directly coupled to the left rear wheel 22L, and a rotor 25r of the right rear motor 25 is directly coupled to the right rear wheel 22R; however, this is non-limiting. For example, the left rear wheel 22L and the rotor 24r may be coupled to each other via a gear train, and the right rear wheel 22R and the rotor 25r may be coupled to each other via a gear train.

An inverter 16 is coupled to a stator 14s of the left front motor 14, and an inverter 17 is coupled to a stator 15s of the right front motor 15. Similarly, an inverter 26 is coupled to a stator 24s of the left rear motor 24, and an inverter 27 is coupled to a stator 25s of the right rear motor 25. A battery pack 31 is coupled to the inverters 16, 17, 26, and 27 via an energizing line 30. The battery pack 31 is provided with a battery module 32 including a plurality of battery cells, and is also provided with a battery control unit 33 that monitors charging and discharging of the battery module 32. Further, the battery pack 31 is provided with a battery sensor 34 that detects a charge and discharge current, a terminal voltage, etc. It is to be noted that the battery control unit 33 has a function of calculating an SOC (State of Charge) that is a charge state of the battery module 32 on the basis of the charge and discharge current, the terminal voltage, etc. detected by the battery sensor 34.

A left front control unit 18 is coupled to the inverter 16 to control the left front motor 14. The left front control unit 18 controls the inverter 16 including a plurality of switching devices and the like to control an energized state of the stator 14s and to thereby control motor torque (power running torque and regenerative torque) of the left front motor 14. Similarly, a right front control unit 19 is coupled to the inverter 17 to control the right front motor 15. The right front control unit 19 controls the inverter 17 including a plurality of switching devices and the like to control an energized state of the stator 15s and to thereby control motor torque (power running torque and regenerative torque) of the right front motor 15. Upon controlling the left front motor 14 and the right front motor 15 to be in a power running state, electric power is suppled from the battery module 32 to the stators 14s and 15s via the inverters 16 and 17. In contrast, upon controlling the left front motor 14 and the right front motor 15 to be in a regenerative state, i.e., a power generation state, electric power is supplied from the stators 14s and 15s to the battery module 32 via the inverters 16 and 17.

A left rear control unit 28 is coupled to the inverter 26 to control the left rear motor 24. The left rear control unit 28 controls the inverter 26 including a plurality of switching devices and the like to control an energized state of the stator 24s and to thereby control motor torque (power running torque and regenerative torque) of the left rear motor 24. Similarly, a right rear control unit 29 is coupled to the inverter 27 to control the right rear motor 25. The right rear control unit 29 controls the inverter 27 including a plurality of switching devices and the like to control an energized state of the stator 25s and to thereby control motor torque (power running torque and regenerative torque) of the right rear motor 25. Upon controlling the left rear motor 24 and the right rear motor 25 to be in a power running state, electric power is suppled from the battery module 32 to the stators 24s and 25s via the inverters 26 and 27. In contrast, upon controlling the left rear motor 24 and the right rear motor 25 to be in a regenerative state, i.e., a power generation state, electric power is supplied from the stators 24s and 25s to the battery module 32 via the inverters 26 and 27.

[Control System]

The vehicle control apparatus 10 is provided with a control system 40 including a plurality of electronic control units to control the front-wheel drive system 13, the rear-wheel drive system 23, and the like. As the electronic control units included in the control system 40, the battery control unit 33, the left front control unit 18, the right front control unit 19, the left rear control unit 28, and the right rear control unit 29 described above are provided, and a vehicle control unit 41 is also provided. The vehicle control unit 41 supplies control signals to the control units 18, 19, 28, 29, and 33. The control units 18, 19, 28, 29, 33, and 41 are communicably coupled to each other via an on-vehicle network 42 such as a CAN or a LIN. The vehicle control unit 41 sets operation targets of the left front motor 14, the right front motor 15, the rear motors 24 and 25, and the like on the basis of input information from the control units 18, 19, 28, 29, and 33 and various sensors which will be described later. Further, the vehicle control unit 41 generates control signals corresponding to the operation targets of the left front motor 14, the right front motor 15, the rear motors 24 and 25, and the like and supplies the generated control signals to the respective control units 18, 19, 28, 29, and 33.

As sensors coupled to the vehicle control unit 41, an accelerator sensor 50 and a brake sensor 51 are provided. The accelerator sensor 50 detects an operation amount of an accelerator pedal. The brake sensor 51 detects an operation amount of a brake pedal 46. In addition, as sensors coupled to the vehicle control unit 41, an acceleration sensor 52, a GPS (Global Positioning System) sensor 53, and a yaw rate sensor 54 are provided. The acceleration sensor 52 detects acceleration acting on the vehicle 11. The GPS sensor 53 detects a traveling position of the vehicle 11. The yaw rate sensor 54 detects a yaw rate that is a rotation angular speed around a vertical axis of the vehicle 11. Further, a wheel speed sensor 55 is coupled to the left front control unit 18, and a wheel speed sensor 56 is coupled to the right front control unit 19. The wheel speed sensor 55 includes, for example, a resolver that detects a rotation speed of the left front wheel 12L. The wheel speed sensor 56 includes, for example, a resolver that detects a rotation speed of the right front wheel 12R. Similarly, a wheel speed sensor 57 is coupled to the left rear control unit 28, and a wheel speed sensor 58 is coupled to the right rear control unit 29. The wheel speed sensor 57 includes, for example, a resolver that detects a rotation speed of the left rear wheel 22L. The wheel speed sensor 58 includes, for example, a resolver that detects a rotation speed of the right rear wheel 22R. In addition, a start switch 59 is coupled to the vehicle control unit 41. The start switch 59 is to be operated by a driver upon starting the control system 40.

Figure 3:
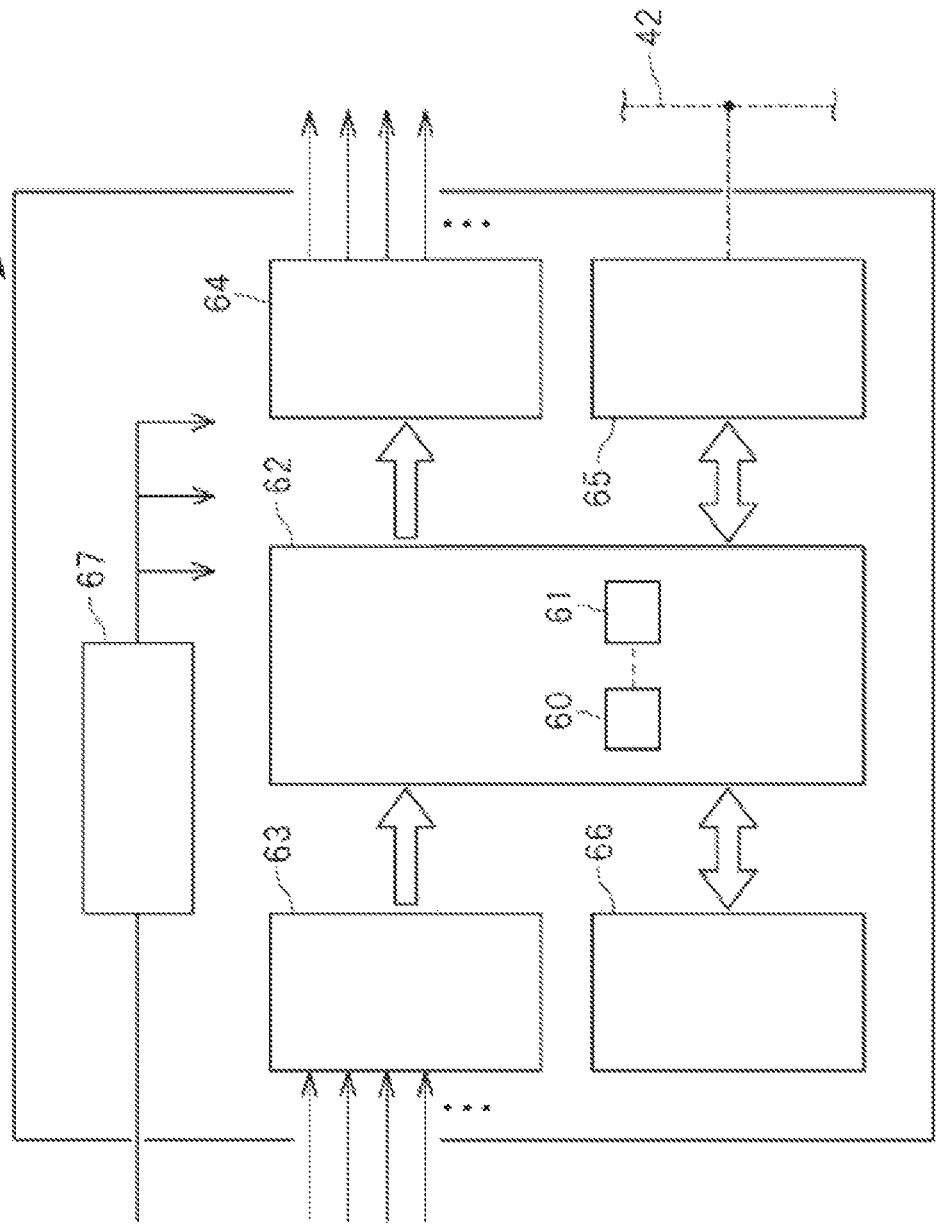
FIG. 3 is a diagram illustrating a basic structure of each control unit in a simple manner.

FIG. 3 is a diagram illustrating a basic structure of each of the control units 18, 19, 28, 29, 33, and 41 in a simple manner. As illustrated in FIG. 3, each of the control units 18, 19, 28, 29, 33, and 41 includes a microcontroller 62 in which a processor 60, a memory 61, and the like are incorporated. The memory 61 holds a predetermined program therein, and the processor 60 executes an instruction set of the program. The processor 60 and the memory 61 are communicatively coupled to each other. It is to be noted that, in the illustrated example, one processor 60 and one memory 61 are incorporated in the microcontroller 62; however, this is non-limiting. A plurality of processors 60 may be incorporated in the microcontroller 62, or a plurality of memories 61 may be incorporated in the microcontroller 62.

In addition, each of the control units 18, 19, 28, 29, 33, and 41 is provided with an input conversion circuit 63, a drive circuit 64, a communication circuit 65, an external memory 66, a power supply circuit 67, and the like. The input conversion circuit 63 converts a signal received from each of the various sensors into a signal inputtable to the microcontroller 62. The drive circuit 64 generates a drive signal for an actuator of each of the front motors 14 and 15, the rear motors 24 and 25, and the like described above on the basis of a signal supplied from the microcontroller 62. The communication circuit 65 converts a signal supplied from the microcontroller 62 to a communication signal directed to another control unit. The communication circuit 65 also converts a communication signal received from another control unit into a signal inputtable to the microcontroller 62. Further, the power supply circuit 67 supplies a stable power-supply voltage to each of the microcontroller 62, the input conversion circuit 63, the drive circuit 64, the communication circuit 65, the external memory 66, and the like. Further, the external memory 66 such as a non-volatile memory holds data or the like to be held even in a non-energized state.

[Requested Driving Force]

Figure 4:
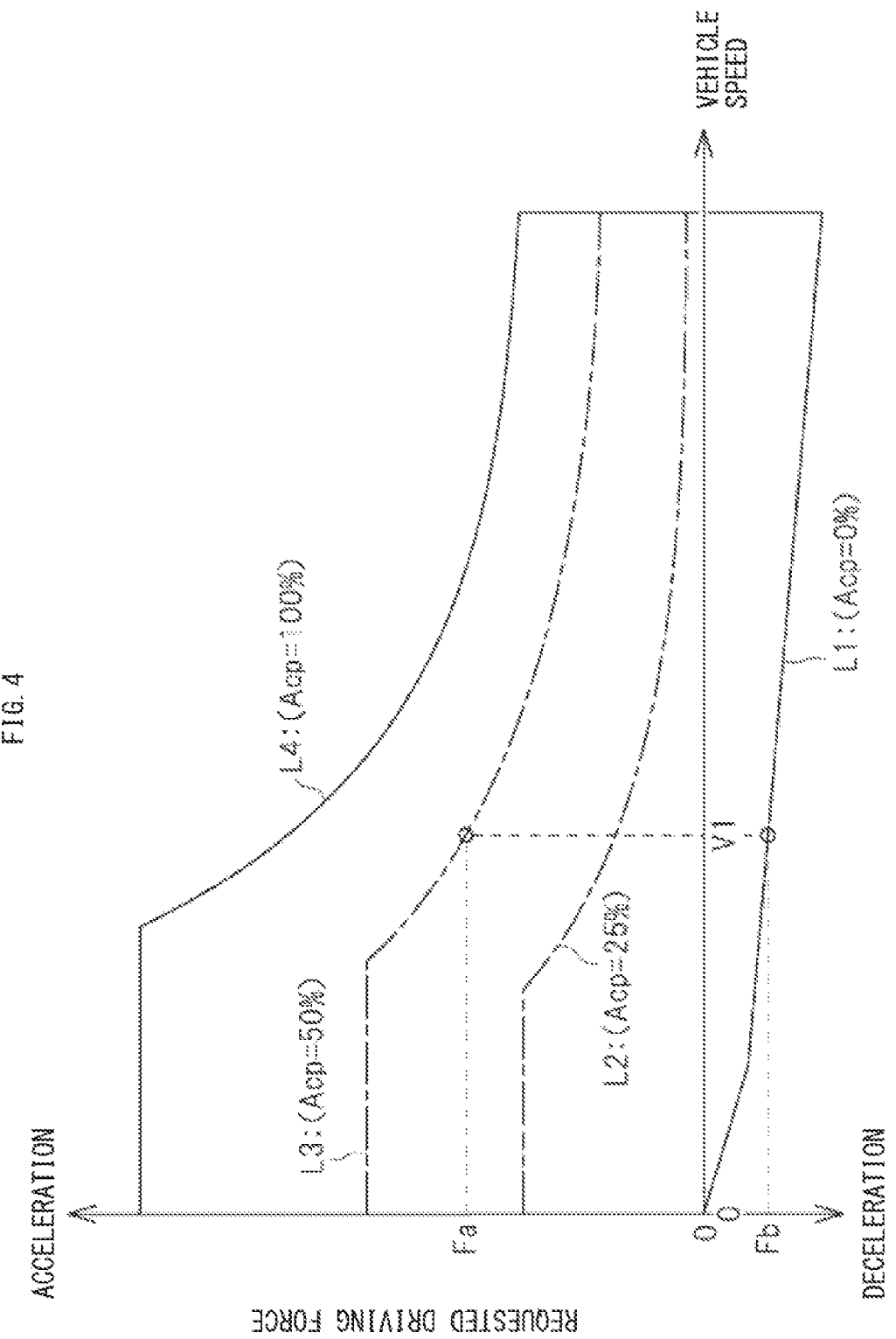
FIG. 4 is a diagram illustrating an example of a driving force map describing requested driving force.

FIG. 4 is a diagram illustrating an example of a driving force map that illustrates requested driving force. As illustrated in FIG. 4, characteristic lines L1 to L4 are set in the driving force map. The characteristic lines L1 to L4 each indicate requested driving force for a corresponding operation amount of the accelerator pedal (hereinafter, referred to as an "accelerator position"). That is, the vehicle control unit 41 sets the requested driving force for the vehicle 11 along the characteristic line L1 in a case where an accelerator position Acp is 0%, and sets the requested driving force for the vehicle 11 along the characteristic line L2 in a case where the accelerator position Acp is 25%. Further, the vehicle control unit 41 sets the requested driving force for the vehicle 11 along the characteristic line L3 in a case where the accelerator position Acp is 50%, and sets the requested driving force for the vehicle 11 along the characteristic line L4 in a case where the accelerator position Acp is 100%.

For example, in a case where the accelerator pedal is depressed to bring the accelerator position Acp to "50%" under a situation where the vehicle is "V1", the vehicle control unit 41 sets "Fa" as the requested driving force. Further, in a case where the depressed accelerator pedal is released to bring the accelerator position Acp to "0%" under the situation where the vehicle speed is "V1", the vehicle control unit 41 sets "Fb" as the requested driving force. Further, the vehicle control unit 41 sets target motor torque Tl of each of the left front motor 14, the right front motor 15, and the rear motors 24 and 25 to obtain "Fa" or "Fb" as the requested driving force, i.e., the total driving force for the wheels 12L, 12R, 22L, and 22R.

That is, in a case where the accelerator pedal is depressed and the requested driving force is set on an acceleration side, the target motor torque of each of the front motors 14 and 15 and the rear motors 24 and 25 is set on a power running side. In contrast, in a case where the depressed accelerator pedal is released and the requested driving force is set on a deceleration side, i.e., on a braking side, the target motor torque of each of the front motors 14 and 15 and the rear motors 24 and 25 is set on a regenerative side. It is to be noted that four characteristic lines L1 to L4 are set in the driving force map illustrated in FIG. 4 for easier description; however, this is non-limiting. It goes without saying that five or more characteristic lines may be set in the driving force map.

[Motor Torque Control Upon Coasting]

As illustrated in FIG. 4, in a case where the accelerator position Acp is "0%", the requested driving force for the vehicle 11 is set on the deceleration side. That is, upon coasting in which the accelerator operation and the brake operation are not performed, the requested driving force is set on the deceleration side in accordance with the vehicle speed; therefore, the target motor torque of each of the left front motor 14, the right front motor 15, and the rear motors 24 and 25 is set on the regenerative side. Here, on a low-μ road such as a compacted snow road surface or a frozen road surface, a road surface in contact with each of the wheels 12L, 12R, 22L, and 22R often has an uneven friction coefficient. Therefore, a uniform control of the respective regenerative states of the left front motor 14, the right front motor 15, and the rear motors 24 and 25 may cause each of the wheels 12L, 12R, 22L, and 22R to slip or to be locked, which may result in an unstable vehicle attitude.

To address the above, the control system 40 included in the vehicle control apparatus 10 executes a front torque control of controlling the regenerative torque of each of the left front motors 14 and 15 and a rear torque control of controlling the regenerative torque of each of the rear motors 24 and 25 upon coasting. As will be described later, execution of such regenerative torque controls makes it possible to suppress an excessive slip of each of the wheels 12L, 12R, 22L, and 22R, making it possible to stabilize a vehicle behavior upon coasting. It is to be noted that each step described in flowcharts of FIGS. 5 to 11 described below describes a process to be executed by the one or the plurality of processors 60 included in the control system 40. In addition, the front torque control and the rear torque control described below are controls to be executed by the control system 40 every predetermined cycle after the start switch 59 is operated by the driver and the control system 40 including the vehicle control unit 41 and the like is activated.

<Front Torque Control>

Figure 5:
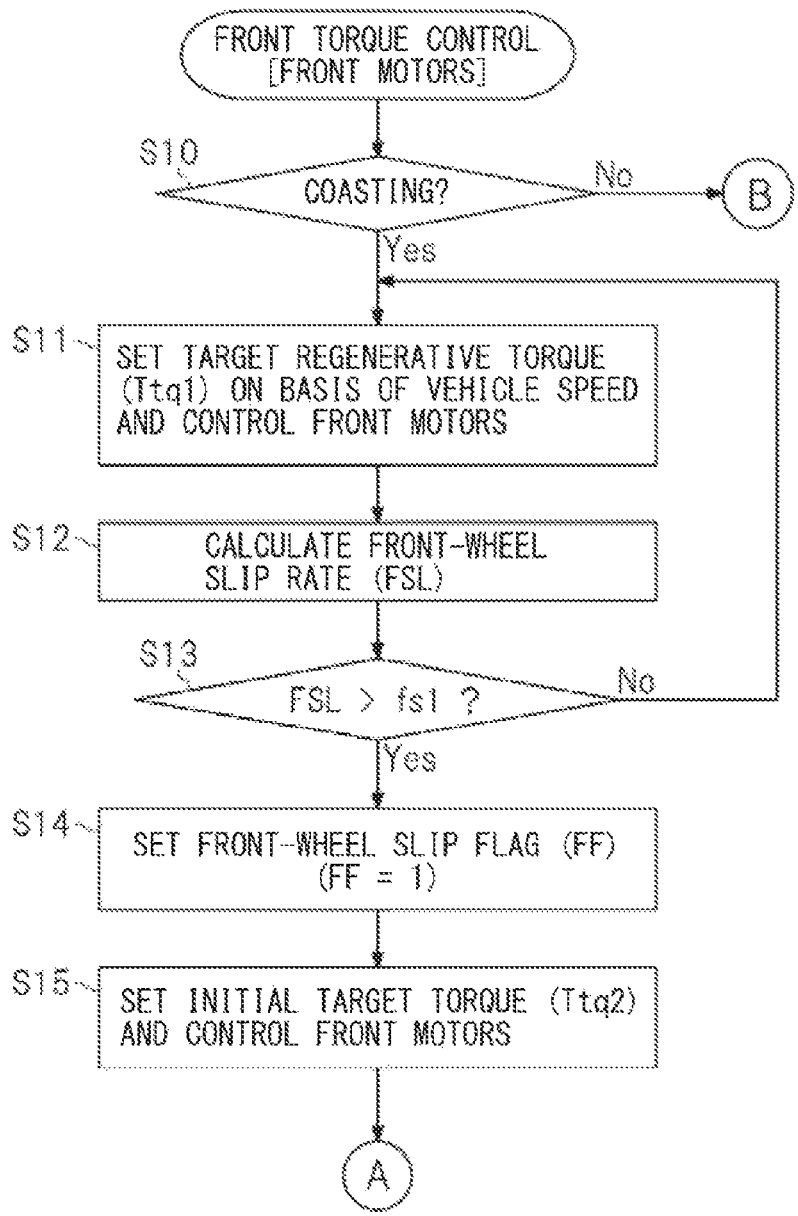
FIG. 5 is a flowchart illustrating an example of an execution procedure of a front torque control of controlling regenerative torque of each of front motors.
Figure 6:
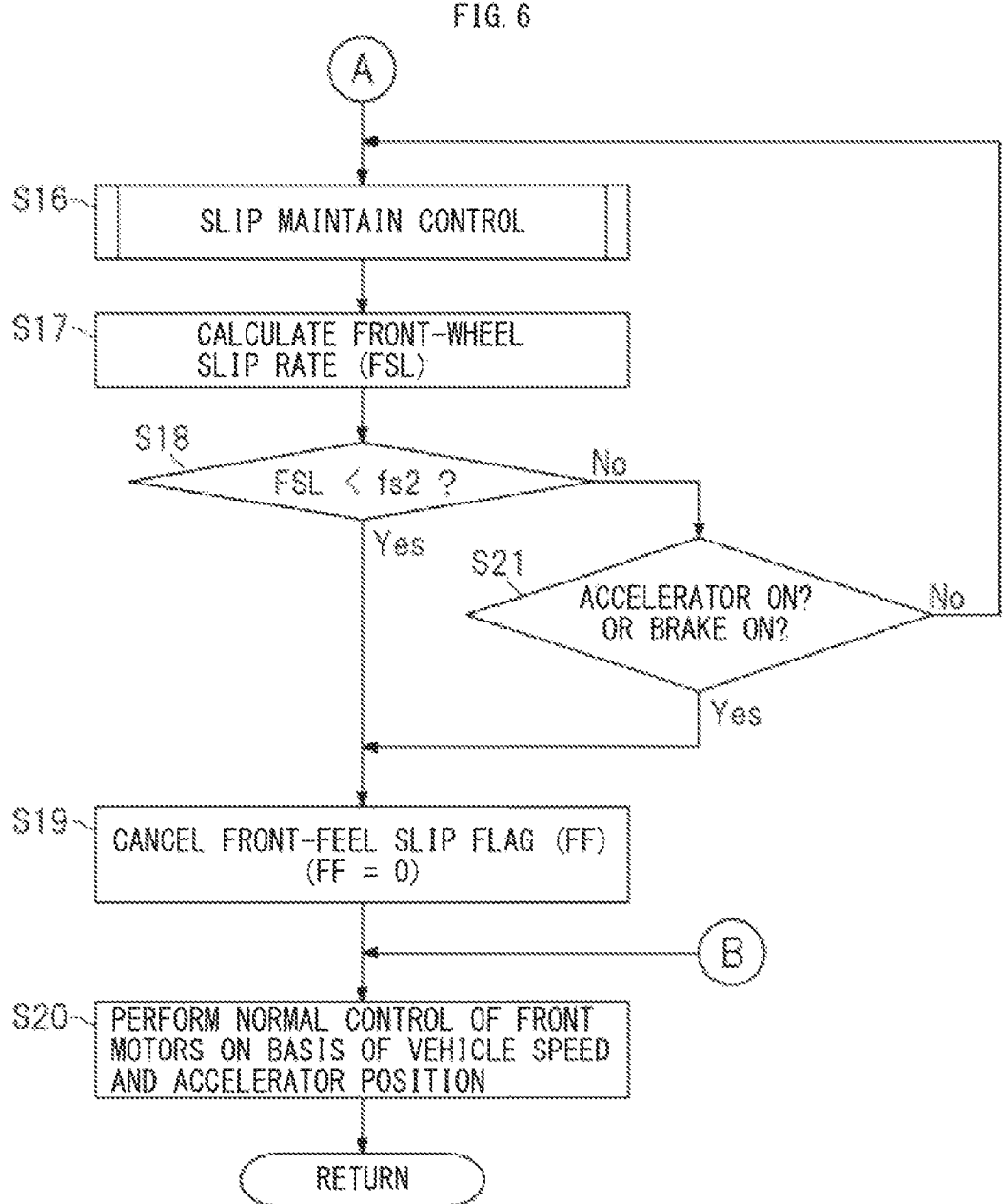
FIG. 6 is a flowchart illustrating an example of the execution procedure of the front torque control of controlling the regenerative torque of each of the front motors.
Figure 7:
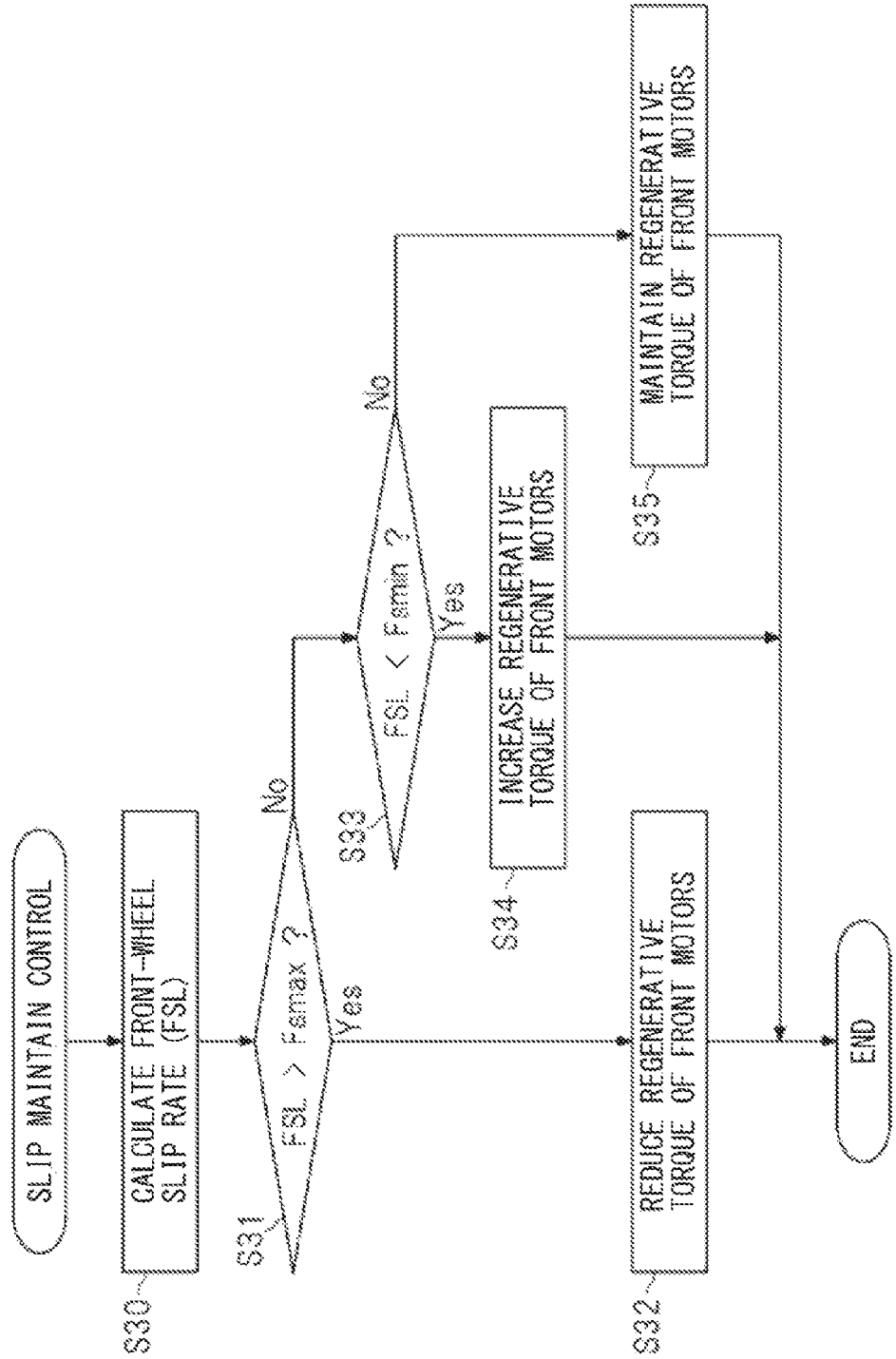
FIG. 7 is a flowchart illustrating an example of an execution procedure of a slip maintain control to be executed in the front torque control.

In the following, described is the front torque control for controlling each of the front motors 14 and 15. FIGS. 5 and 6 are each a flowchart illustrating an example of an execution procedure of the front torque control of controlling the regenerative torque of each of the front motors 14 and 15. Further, FIG. 7 is a flowchart illustrating an example of an execution procedure of a slip maintain control to be executed in the front torque control. Further, the flowcharts of FIGS. 5 and 6 are connected to each other at respective parts denoted by reference numerals A and B.

As illustrated in FIG. 5, in step S10, it is determined whether or not coasting is performed in which the accelerator operation and the brake operation are not performed. If it is determined that the coasting is performed in step S10, the process proceeds to step S11, in which target regenerative torque Ttq1 is set on the basis of the vehicle speed, and the regenerative torque of each of the front motors 14 and 15 is controlled toward the target regenerative torque Ttq1. It is to be noted that the target regenerative torque Ttq1 set in step S11 is the target motor torque on the regenerative side set for each of the front motors 14 and 15 in order to obtain the requested driving force set on the deceleration side upon coasting, as described above with reference to FIG. 4.

In step S12 thereafter, a slip rate of each of the front wheels 12L and 12R (hereinafter, referred to as a front-wheel slip rate FSL) is calculated on the basis of the following Expression (1). In Expression (1), "Vv" is a body speed, i.e., a moving speed of a vehicle body, and "Vfw" is a wheel speed, i.e., a rotation speed of each of the front wheels 12L and 12R. That is, in a case where each of the front wheels 12L and 12R is slipping, i.e., is locked, on the low-μ road such as the frozen road surface, the wheel speed Vfw decreases with respect to the body speed Vv; therefore, the calculation results in a large front-wheel slip rate FSL. In contrast, in a case where each of the front wheels 12L and 12R is not slipping on a high-μ road such as a dry road surface, the body speed Vv and the wheel speed Vfw are almost the same as each other; therefore, the calculation results in a small front-wheel slip rate FSL. It is to be noted that the vehicle control unit 41 is able to calculate the body speed Vv on the basis of detected information of the acceleration sensor 52, the GPS sensor 53, etc. For example, upon calculating the body speed Vv using vehicle acceleration in a front-rear direction, it is possible to calculate the body speed Vv by multiplying the acceleration at each predetermined sampling time by the sampling time and integrating the results. In addition, the vehicle control unit 41 is able to calculate the wheel speed Vfw on the basis of detected information of the wheel speed sensors 55 and 56 for the front wheels 12L and 12R.

$$FSL = (Vv - Vfw)/Vv \qquad \text{Expression (1)}$$

After the front-wheel slip rate FSL is calculated in step S12, the process proceeds to step S13, in which it is determined whether or not the front-wheel slip rate FSL is greater than a predetermined threshold (a start threshold) fs1. A situation in which the front-wheel slip rate FSL is determined as being the threshold fs1 or less in step S13 is a situation in which the front wheels 12L and 12R are not slipping excessively. Therefore, if the front-wheel slip rate FSL is determined as being the threshold fs1 or less in step S13, the process returns to step S11, and the regenerative control of each of the front motors 14 and 15 based on the target regenerative torque Ttq1 is continued. In contrast, a situation in which the front-wheel slip rate FSL is determined as being greater than the threshold fs1 in step S13 is a situation in which each of the front wheels 12L and 12R is slipping excessively. Therefore, if the front-wheel slip rate FSL is determined as being greater than the threshold fs1 in step S13, the process proceeds to step S14, in which a front-wheel slip flag FF is set (FF=1). Thereafter, the process proceeds to step S15, in which initial target torque (initial front-wheel torque) Ttq2 for eliminating the slip of each of the front wheels 12L and 12R is set, and the regenerative torque of each of the front motors 14 and 15 is reduced toward the initial target torque Ttq2. It is to be noted that the initial target torque Ttq2 is target torque set on the basis of a simulation or the like in terms of eliminating the excessive slip of each of the front wheels 12L and 12R. The initial target torque Ttq2 may be regenerative torque less than the target regenerative torque Ttq1, or may be torque set to zero or on the power running side.

As described above, if the front-wheel slip rate FSL is determined as being greater than the threshold fs1 in step S13, the process proceeds to step S15, and the regenerative torque of each of the front motors 14 and 15 is reduced toward the initial target torque Ttq2. Thereafter, as described in FIG. 6, the process proceeds to step S16, in which the slip maintain control is executed to cause the front-wheel slip rate FSL to converge to a predetermined target slip rate (a target front-wheel value) Tfs. In the slip maintain control, as described in FIG. 7, the front-wheel slip rate FSL is calculated in step S30, and it is determined whether or not the front-wheel slip rate FSL is greater than an upper-limit slip rate Fsmax in step S31 thereafter. It is to be noted that the upper-limit slip rate Fsmax is a value obtained by adding a predetermined value α to the target slip rate Tfs as described in the following Expression (2). If the front-wheel slip rate FSL is determined as being greater than the upper-limit slip rate Fsmax in step S31, the process proceeds to step S32, in which the regenerative torque of each of the front motors 14 and 15 is reduced. It is to be noted that in step S32, the regenerative torque of each of the front motors 14 and 15 may be reduced by a predetermined amount, or the regenerative torque of each of the front motors 14 and 15 may be reduced by a reduction amount based on the front-wheel slip rate FSL.

$$Fsmax = Tfs + \alpha \qquad \text{Expression (2)}$$

In contrast, if the front-wheel slip rate FSL is determined as being the upper-limit slip rate Fsmax or less in step S31, the process proceeds to step S33, in which it is determined whether or not the front-wheel slip rate FSL is less than a lower-limit slip rate Fsmin. It is to be noted that the lower-limit slip rate Fsmin is a value obtained by subtracting the predetermined value α from the target slip rate Tfs as described in the following Expression (3). If the front-wheel slip rate FSL is determined as being less than the lower-limit slip rate Fsmin in step S33, the process proceeds to step S34, in which the regenerative torque of each of the front motors 14 and 15 is increased. It is to be noted that in step S34, the regenerative torque of each of the front motors 14 and 15 may be increased by a predetermined amount, or the regenerative torque of each of the front motors 14 and 15 may be increased by an increase amount based on the front-wheel slip rate FSL.

$$Fsmin = Tfs - \alpha \qquad \text{Expression (3)}$$

Further, if the front-wheel slip rate FSL is determined as being the lower-limit slip rate Fsmin or greater in step S33, i.e., if the front-wheel slip rate FSL is determined as being held in the vicinity of the target slip rate Tfs in step S33, the process proceeds to step S35, in which the regenerative torque of each of the front motors 14 and 15 is maintained. Thus, in the slip maintain control, the front-wheel slip rate FSL is caused to converge to the target slip rate Tfs (e.g., 10%) by increasing or decreasing the regenerative torque of each of the front motors 14 and 15 in accordance with the front-wheel slip rate FSL. This makes it possible to increase gripping of each of the front wheels 12L and 12R and to thereby stabilize a traveling attitude of the vehicle 11 coasting on the low-μ road.

After such a slip maintain control is executed, as described in FIG. 6, the process proceeds to step S17, in which the front-wheel slip rate FSL is calculated. Thereafter, the process proceeds to step S18, in which it is determined whether or not the front-wheel slip rate FSL is less than a threshold (an end threshold) fs2 that is less than the threshold fs1. A situation in which the front-wheel slip rate FSL is determined as being less than the threshold fs2 in step S18 is a situation in which the slip of each of the front wheels 12L and 12R has been eliminated and a traveling road surface has changed from the low-μ road to the high-μ road such as the dry road surface. Therefore, if the front-wheel slip rate FSL is determined as being less than the threshold fs2 in step S18, the process proceeds to step S19, in which the setting of the front-wheel slip flag FF is cancelled (FF=0). Thereafter, the process proceeds to step S20, in which the target motor torque is set on the basis of the vehicle speed and the accelerator position, and a normal control is executed to control the torque of each of the front motors 14 and 15 toward the set target motor torque.

In contrast, a situation in which the front-wheel slip rate FSL is determined as being the threshold fs2 or greater in step S18 is a situation in which each of the front wheels 12L and 12R is continuously slipping. In this case, the process proceeds to step S21, in which it is determined whether or not the accelerator pedal or the brake pedal is depressed. If the accelerator pedal or the brake pedal is depressed in step S21, a driving situation in which the coasting is cancelled is present. Therefore, the process proceeds to step S19, in which the setting of the front-wheel slip flag FF is cancelled, and the process proceeds to step S20, in which the normal control of each of the front motors 14 and 15 is executed. In contrast, if the accelerator pedal or the brake pedal is determined as not being depressed in step S21, i.e., if it is determined that a driving situation to maintain the coasting is present, the process returns to step S16, and the above-described slip maintain control is continuously executed.

<Rear Torque Control>

Figure 8:
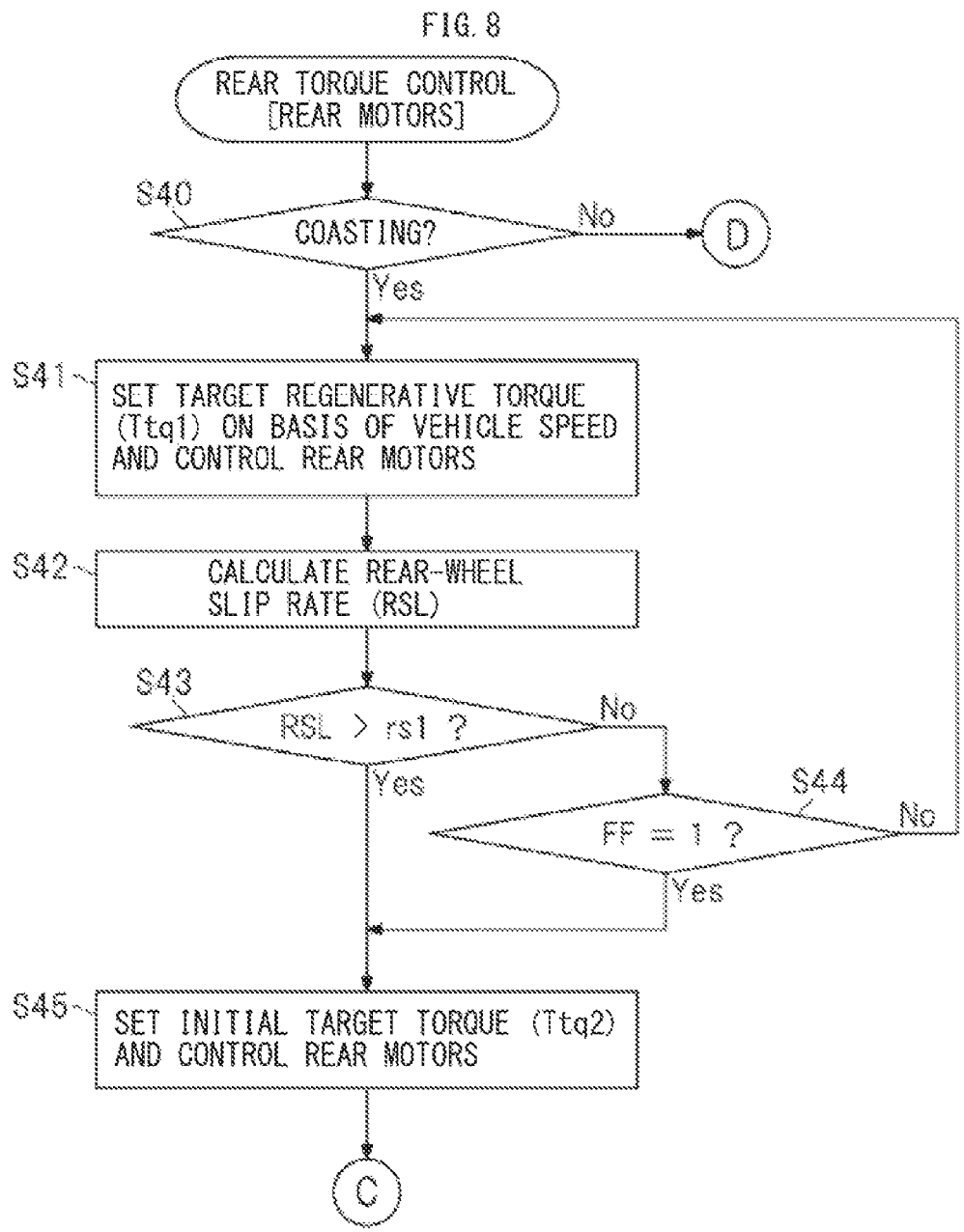
FIG. 8 is a flowchart illustrating an example of an execution procedure of a rear torque control of controlling regenerative torque of each of rear motors.
Figure 9:
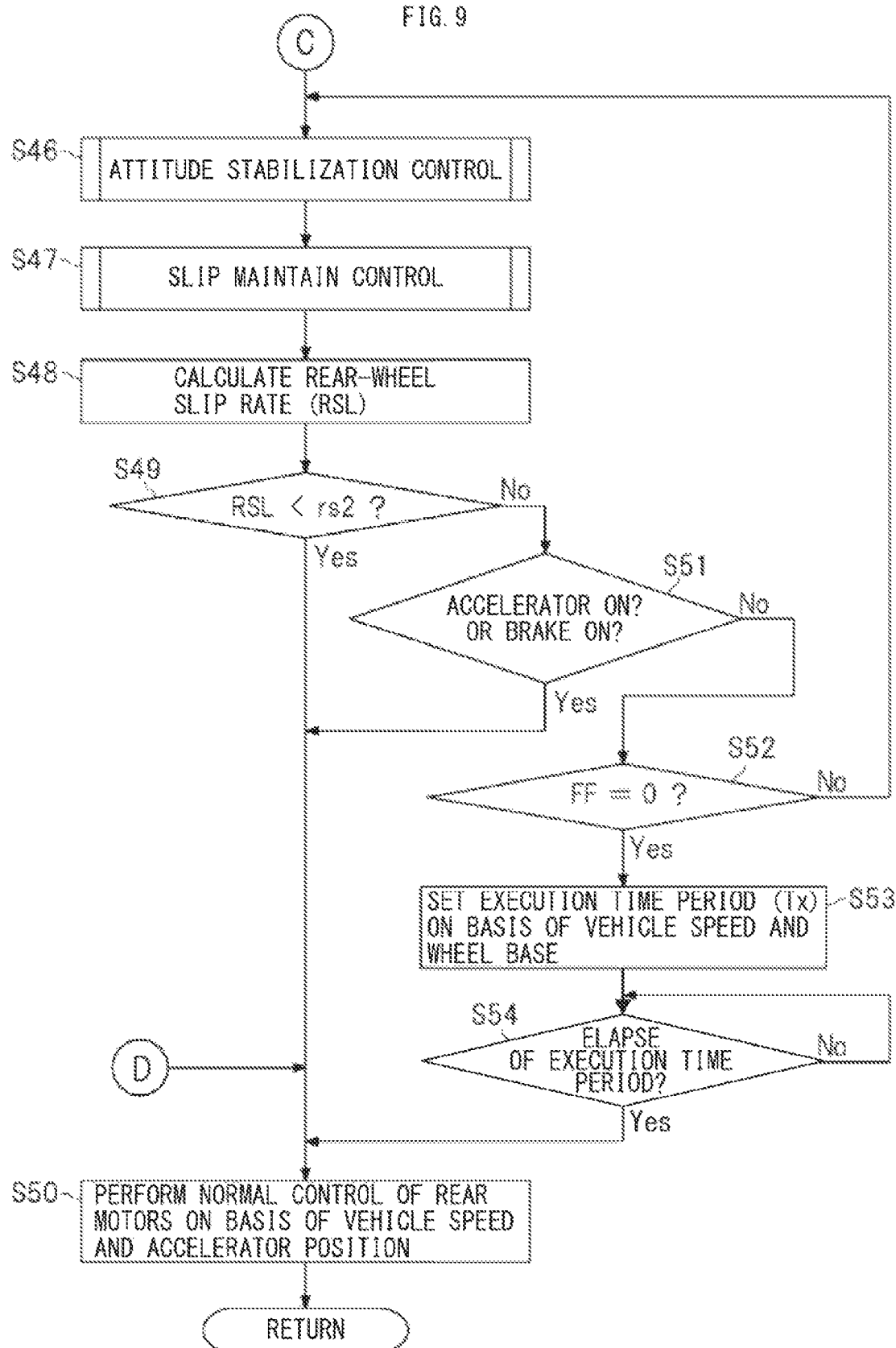
FIG. 9 is a flowchart illustrating an example of the execution procedure of the rear torque control of controlling the regenerative torque of the rear motor.
Figure 10:
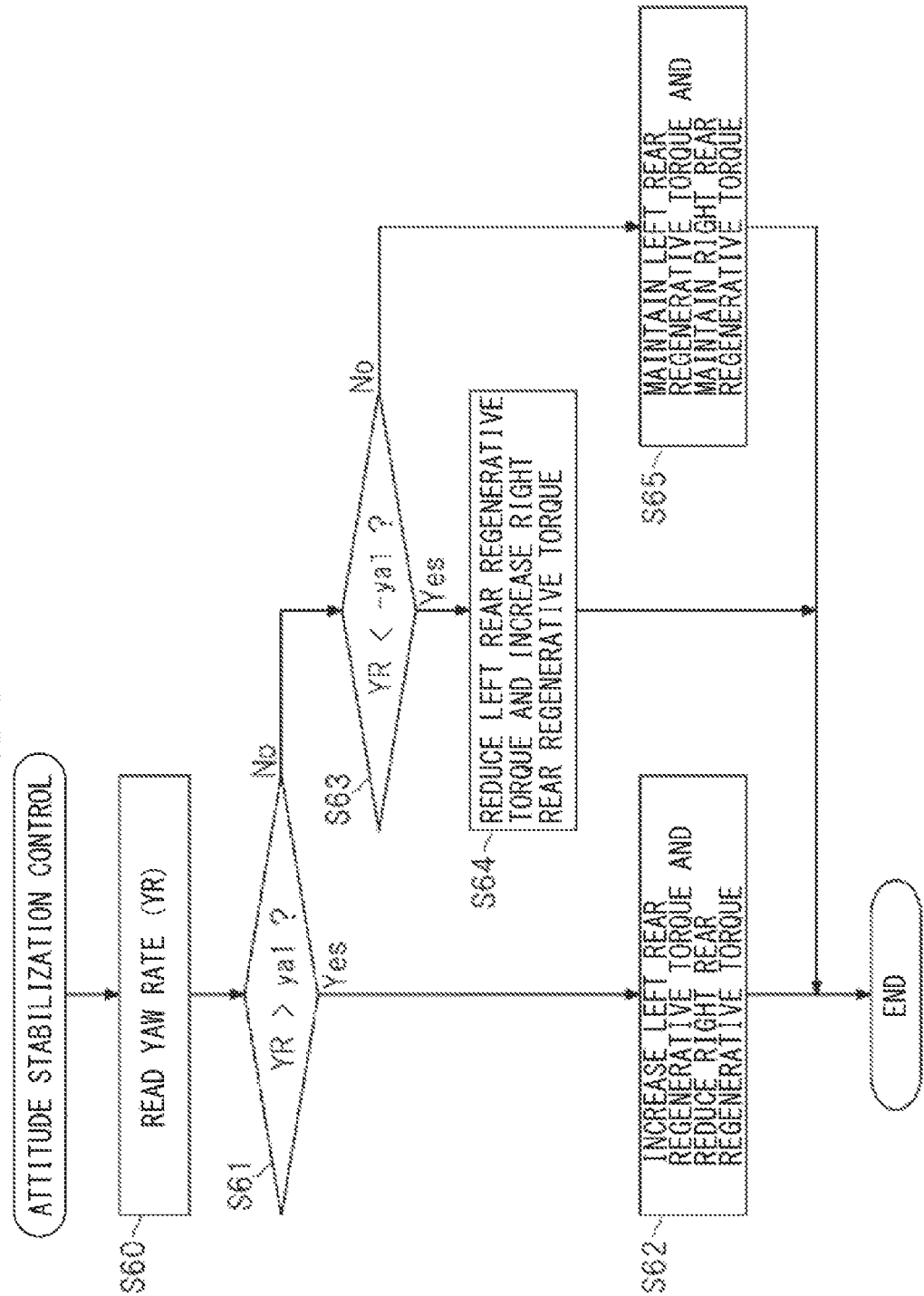
FIG. 10 is a flowchart illustrating an example of an execution procedure of an attitude stabilization control to be executed in the rear torque control.
Figure 11:
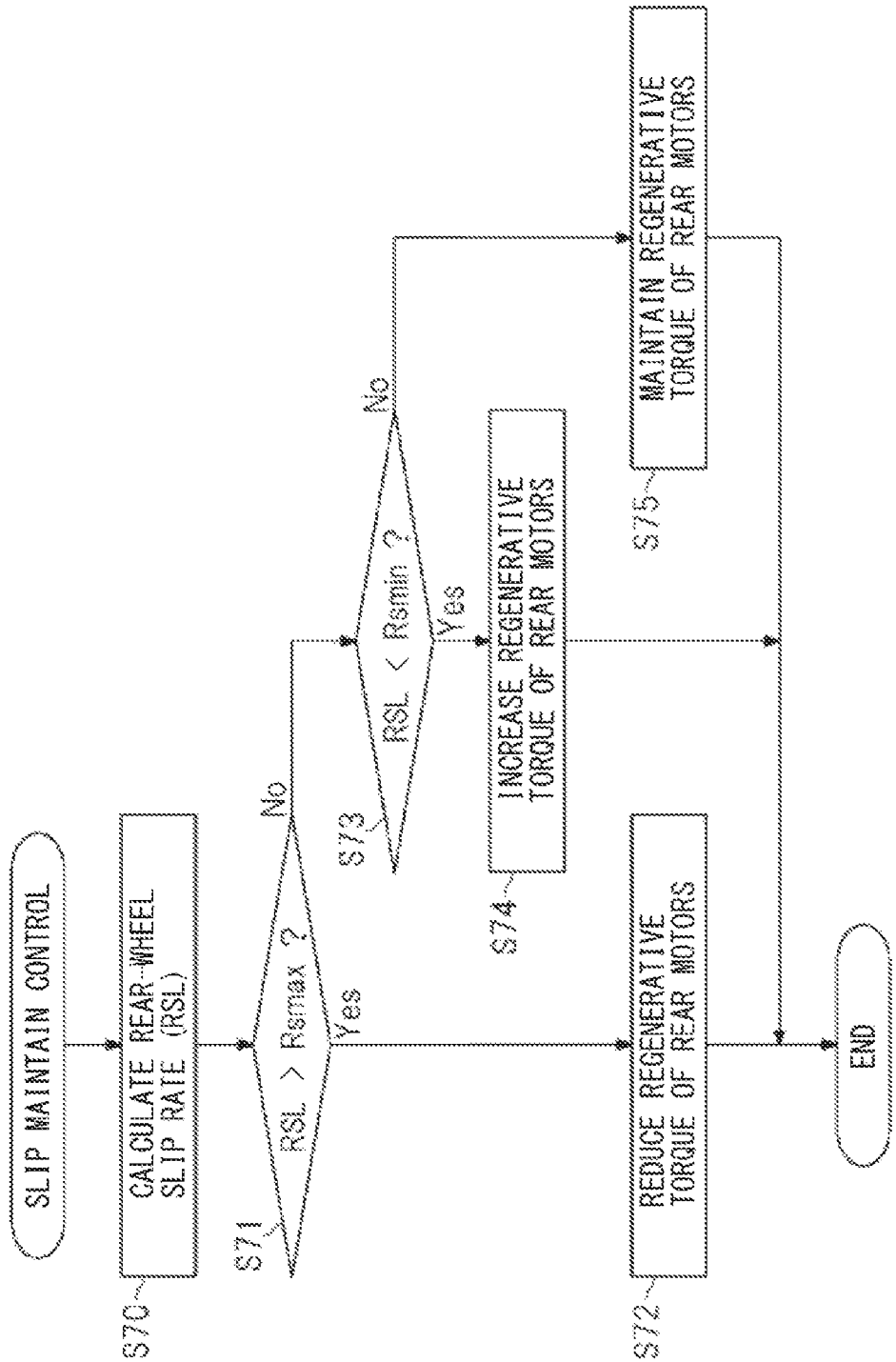
FIG. 11 is a flowchart illustrating an example of an execution procedure of a slip maintain control to be executed in the rear torque control.

Next, described is the rear torque control for controlling each of the rear motors 24 and 25. FIGS. 8 and 9 are each a flowchart illustrating an example of an execution procedure of the rear torque control of controlling the regenerative torque of each of the rear motors 24 and 25. Further, FIG. 10 is a flowchart illustrating an example of an execution procedure of an attitude stabilization control to be executed in the rear torque control, and FIG. 11 is a flowchart illustrating an example of an execution procedure of a slip maintain control to be executed in the rear torque control. Further, the flowcharts of FIGS. 8 and 9 are connected to each other at respective parts denoted by reference numerals C and D.

As illustrated in FIG. 8, in step S40, it is determined whether or not coasting is performed in which the accelerator operation and the brake operation are not performed. If it is determined that the coasting is performed in step S40, the process proceeds to step 41, in which the target regenerative torque Ttq1 is set on the basis of the vehicle speed, and the regenerative torque of each of the rear motors 24 and 25 is controlled toward the target regenerative torque Ttq1. It is to be noted that the target regenerative torque Ttq1 set in step S41 is the target motor torque on the regenerative side set for each of the rear motors 24 and 25 in order to obtain the requested driving force set on the deceleration side upon coasting, as described above with reference to FIG. 4.

In step S42 thereafter, a slip rate of each of the rear wheels 22L and 22R (hereinafter, referred to as a rear-wheel slip rate RSL) is calculated on the basis of the following Expression (4). In Expression (4), "Vv" is the body speed, i.e., the moving speed of the vehicle body, and "Vrw" is a wheel speed, i.e., a rotation speed of each of the rear wheels 22L and 22R. That is, in a case where each of the rear wheels 22L and 22R is slipping, i.e., is locked, on the low-u road such as the frozen road surface, the wheel speed Vrw decreases with respect to the body speed Vv; therefore, the calculation results in a large rear-wheel slip rate RSL. In contrast, in a case where each of the rear wheels 22L and 22R is not slipping on the high-u road such as the dry road surface, the body speed Vv and the wheel speed Vrw are almost the same as each other; therefore, the calculation results in a small rear-wheel slip rate RSL. As described above, the vehicle control unit 41 is able to calculate the body speed Vv on the basis of the detected information of the acceleration sensor 52, the GPS sensor 53, etc. In addition, the vehicle control unit 41 is able to calculate the wheel speed Vrw on the basis of detected information of the wheel speed sensors 57 and 58 for the rear wheels 22L and 22R.

$$RSL = (Vv - Vrw)/Vv \qquad \text{Expression (4)}$$

After the rear-wheel slip rate RSL is calculated in step S42, the process proceeds to step S43, in which it is determined whether or not the rear-wheel slip rate RSL is greater than a predetermined threshold rs1. If the rear-wheel slip rate RSL is determined as being the threshold rs1 or less in step S43, the process proceeds to step S44, in which it is determined whether or not the front-wheel slip flag FF is set.

Further, if the front-wheel slip flag FF is determined as not being set in step S44, the process returns to step S41, and the regenerative control of each of the rear motors 24 and 25 based on the target regenerative torque Ttq1 is continued. That is, a situation in which the rear-wheel slip rate RSL is determined as being the threshold rs1 or less in step S43 is a situation in which each of the rear wheels 22L and 22R is not slipping excessively, and a situation in which the front-wheel slip flag FF is determined as not being set in step S44 is a situation in which each of the front wheels 12L and 12R is not slipping excessively. Accordingly, if the front-wheel slip flag FF is determined as not being set in step S44, the front wheels 12L and 12R and the rear wheels 22L and 22R are not slipping excessively. Therefore, the process returns to step S41 and the regenerative control of each of the rear motors 24 and 25 based on the target regenerative torque Ttq1 is continued.

In contrast, if the rear-wheel slip rate RSL is determined as being greater than the threshold rs1 in step S43 or if the front-wheel slip flag FF is determined as being set in step S44, the process proceeds to step S45. In step S45, initial target torque (initial rear-wheel torque) Ttq2 for eliminating the slip of each of the rear wheels 22L and 22R is set, and the regenerative torque of each of the rear motors 24 and 25 is reduced toward the initial target torque Ttq2. As described above, a situation in which the rear-wheel slip rate RSL is determined as being greater than the threshold rs1 in step S43 is a situation in which each of the rear wheels 22L and 22R is slipping excessively. Therefore, if the rear-wheel slip rate RSL is determined as being greater than the threshold rs1 in step S43, the process proceeds to step S45, in which the regenerative torque of each of the rear motors 24 and 25 is reduced toward the initial target torque Ttq2. Further, a situation in which the front-wheel slip flag FF is determined as being set in step S44 is a situation in which each of the front wheels 12L and 12R is slipping excessively, and is a situation in which it is highly possible that each of the rear wheels 22L and 22R is also to slip at a timing immediately after. Therefore, if the front-wheel slip flag FF is determined as being set in step S44, the process proceeds to step S45, in which the regenerative torque of each of the rear motors 24 and 25 is reduced toward the initial target torque Ttq2. It is to be noted that the initial target torque Ttq2 is target torque set on the basis of a simulation or the like in terms of eliminating or preventing the excessive slip of each of the rear wheels 22L and 22R. The initial target torque Ttq2 may be regenerative torque less than the target regenerative torque Ttq1, or may be torque set to zero or on the power running side.

As described above, if the rear-wheel slip rate RSL is determined as being greater than the threshold rs1 in step S43, or if the front-wheel slip flag FF is determined as being set in step S44, the process proceeds to step S45, in which the regenerative torque of each of the rear motors 24 and 25 is reduced toward the initial target torque Ttq2. Further, as described in FIG. 9, the process proceeds to step S46, in which the attitude stabilization control is executed to control the regenerative torque of each of the rear motors 24 and 25 positioned on the left and the right and to thereby stabilize the vehicle attitude. In the attitude stabilization control, as described in FIG. 10, a yaw rate YR that is a rotation angular speed around the vertical axis of the vehicle 11 is read in step S60. It is to be noted that if the vehicle attitude is in a clockwise rotation state in step S60, the yaw rate YR of a positive value (+) is read, and if the vehicle attitude is in a counterclockwise rotation state, the yaw rate YR of a negative value (−) is read.

In step S61 thereafter, it is determined whether or not the yaw rate YR is greater than "ya1" that is a predetermined threshold (a behavior determination threshold). A situation in which the yaw rate YR is determined as being greater than the threshold ya1 in step S61 is a situation in which the vehicle 11 coasting on the low-µ road rotates clockwise. Therefore, if the yaw rate YR is determined as being greater than the threshold ya1 in step S61, the process proceeds to step S62, in which the regenerative torque of the left rear motor 24 is increased from a latest value and the regenerative torque of the right rear motor 25 is reduced from a latest value. A difference in the regenerative torque is thus expanded between the rear motors 24 and 25, i.e., a difference in braking force is expanded between the rear wheels 22L and 22R. This makes it possible to cancel a clockwise moment caused on the vehicle 11 and to thereby return the vehicle attitude to a straight traveling state.

In contrast, if the yaw rate YR is determined as being the threshold ya1 or less in step S61, the process proceeds to step S63, in which it is determined whether or not the yaw rate YR is less than "−ya1" that is a predetermined threshold (a behavior determination threshold). A situation in which the yaw rate YR is determined as being less than the threshold −ya1 in step S63 is a situation in which the vehicle 11 coasting on the low-µ road rotates counterclockwise. Therefore, if the yaw rate YR is determined as being less than the threshold −ya1 in step S63, the process proceeds to step S64, in which the regenerative torque of the left rear motor 24 is reduced from a latest value and the regenerative torque of the right rear motor 25 is increased from a latest value. The difference in the regenerative torque is thus expanded between the rear motors 24 and 25, i.e., the difference in braking force is expanded between the rear wheels 22L and 22R. This makes it possible to cancel a counterclockwise moment caused on the vehicle 11 and to thereby return the vehicle attitude to the straight traveling state.

It is to be noted that in steps S63 and S64, because the yaw rate YR at the time when the vehicle 11 rotates counterclockwise is outputted on a negative side (a minus side), the difference in the regenerative torque between the rear motors 24 and 25 is expanded in a case where the yaw rate YR is less than the threshold −ya1 set on the negative side (the minus side). This means, in other words, also in steps S63 and S64, the difference in the regenerative torque between the rear motors 24 and 25 is expanded in a case where the yaw rate YR is greater than the threshold ya1 by using absolute values of the yaw rate YR and the threshold −ya1.

Further, if the yaw rate YR is determined as being the threshold −ya1 or greater in step S63, the process proceeds to step S65, in which the regenerative torque of each of the left rear motor 24 and the right rear motor 25 is maintained at the latest value. That is, a situation in which the yaw rate YR is determined as being the threshold value −ya1 or greater in step S63 is a situation in which the yaw rate YR is maintained in the vicinity of zero, and is a situation in which the vehicle attitude during the coasting is maintained in the straight traveling state. Therefore, the regenerative torque of each of the left rear motor 24 and the right rear motor 25 is maintained at the latest value in step S65.

Further, as described in FIG. 9, after the attitude stabilization control is executed in step S46, the process proceeds to step S47, in which the slip maintain control is executed to cause the rear-wheel slip rate RSL to converge to a predetermined target slip rate (a target rear-wheel value) Trs. In the slip maintain control, as described in FIG. 11, the rear-wheel slip rate RSL is calculated in step S70, and it is determined whether or not the rear-wheel slip rate RSL is greater than an upper-limit slip rate Rsmax in step S71 thereafter. It is to be noted that the upper-limit slip rate Rsmax is a value obtained by adding a predetermined value α to the target slip rate Trs as described in the following Expression (5). If the rear-wheel slip rate RSL is determined as being greater than the upper-limit slip rate Rsmax in step S71, the process proceeds to step S72, in which the regenerative torque of each of the rear motors 24 and 25 is reduced. It is to be noted that in step S72, the regenerative torque of each of the rear motors 24 and 25 may be reduced by a predetermined amount, or the regenerative torque of each of the rear motors 24 and 25 may be reduced by a reduction amount based on the rear-wheel slip rate RSL.

$$RSmax = Trs + \alpha \qquad \text{Expression (5)}$$

In contrast, if the rear-wheel slip rate RSL is determined as being the upper-limit slip rate Rsmax or less in step S71, the process proceeds to step S73, in which it is determined whether or not the rear-wheel slip rate RSL is less than a lower-limit slip rate Rsmin. It is to be noted that the lower-limit slip rate Rsmin is a value obtained by subtracting the predetermined value α from the target slip rate Trs as described in the following Expression (6). If the rear-wheel slip rate RSL is determined as being less than the lower-limit slip rate Rsmin in step S73, the process proceeds to step S74, in which the regenerative torque of each of the rear motors 24 and 25 is increased. It is to be noted that in step S74, the regenerative torque of each of the rear motors 24 and 25 may be increased by a predetermined amount, or the regenerative torque of each of the rear motors 24 and 25 may be increased by an increase amount based on the rear-wheel slip rate RSL.

$$Rsmin = Trs - \alpha \qquad \text{Expression (6)}$$

Further, if the rear-wheel slip rate RSL is determined as being the lower-limit slip rate Rsmin or greater in step S73, i.e., if the rear-wheel slip rate RSL is determined as being held in the vicinity of the target slip rate Trs in step S73, the process proceeds to step S75, in which the regenerative torque of each of the rear motors 24 and 25 is maintained. Thus, in the slip maintain control, the rear-wheel slip rate RSL is caused to converge to the target slip rate Trs (e.g., 10%) by increasing or decreasing the regenerative torque of each of the rear motors 24 and 25 in accordance with the rear-wheel slip rate RSL. This makes it possible to increase gripping of each of the rear wheels 22L and 22R, and to thereby stabilize the traveling attitude of the vehicle 11 coasting on the low-μ road.

After such a slip maintain control is executed, as described in FIG. 9, the process proceeds to step S48, in which the rear-wheel slip rate RSL is calculated. Thereafter, the process proceeds to step S49, in which it is determined whether or not the rear-wheel slip rate RSL is less than a threshold rs2, which is a predetermined cancel condition. A situation in which the rear-wheel slip rate RSL is determined as being less than the threshold rs2 in step S49 is a situation in which the slip of each of the rear wheels 22L and 22R has been eliminated and the traveling road surface has changed from the low-μ road to the high-μ road such as the dry road surface. Therefore, if the rear-wheel slip rate RSL is determined as being less than the threshold rs2 in step S49, the process proceeds to step S50, in which the target motor torque is set on the basis of the vehicle speed and the accelerator position, and a normal control is executed to control the torque of each of the rear motors 24 and 25 toward the set target motor torque.

In contrast, a situation in which the rear-wheel slip rate RSL is determined as being the threshold rs2 or greater in step S49 is a situation in which each of the rear wheels 22L and 22R is continuously slipping. In this case, the process proceeds to step S51, in which it is determined whether or not the accelerator pedal or the brake pedal is depressed. If the accelerator pedal or the brake pedal is depressed in step S51, a driving situation in which the coasting is cancelled is present. Therefore, the process proceeds to step S50, in which the normal control of each of the rear motors 24 and 25 is executed.

Further, if the accelerator pedal or the brake pedal is not depressed in step S51, the process proceeds to step S52, in which it is determined whether or not the setting of the front-wheel slip flag FF is cancelled. A situation in which the front-wheel slip flag FF is determined as being set in step S52 is a situation in which each of the front wheels 12L and 12R is continuously slipping. That is, a situation in which the rear-wheel slip rate RSL is determined as being the threshold rs2 or greater in step S49 described above is a situation in which each of the rear wheels 22L and 22R is continuously slipping, and a situation in which the front-wheel slip flag FF is determined as being set in step S52 is a situation in which each of the front wheels 12L and 12R is continuously slipping. Therefore, if the front-wheel slip flag FF is determined as being set in step S52, the front wheels 12L and 12R and the rear wheels 22L and 22R are continuously slipping. Therefore, the process returns to steps S46 and S47, in which the attitude stabilization control and the slip maintain control described above are continued.

In contrast, if the setting of the front-wheel slip flag FF is determined as being cancelled in step S52, the process proceeds to step S53, in which an execution time period Tx is calculated on the basis of the vehicle speed Vv and a wheel base WB as described in the following Expression (7). The execution time period Tx is a time period up to a timing when each of the rear wheels 22L and 22R reaches the road surface in contact with each of the front wheels 12L and 12R. After the execution time period Tx is thus calculated in step S53 and it is determined that the execution time period Tx has elapsed in step S54, the process proceeds to step S50, in which the normal control of each of the rear motors 24 and 25 is executed. That is, a situation in which the front-wheel slip flag FF is determined as being cancelled in step S52 is a situation in which the slip of each of the front wheels 12L and 12R is eliminated, and is a situation in which each of the front wheels 12L and 12R has reached the dry road surface. Therefore, even if it is before the slip of each of the rear wheels 22L and 22R is determined as being eliminated, a timing of elimination of the slip of each of the rear wheels 22L and 22R is estimated using the execution time period Tx, and a feed-forward control of each of the rear motors 24 and 25 is executed.

$$Tx = WB/Vv \qquad \text{Expression (7)}$$

[Motor Torque Control Upon Coasting (Timing Chart)]

Figure 12:
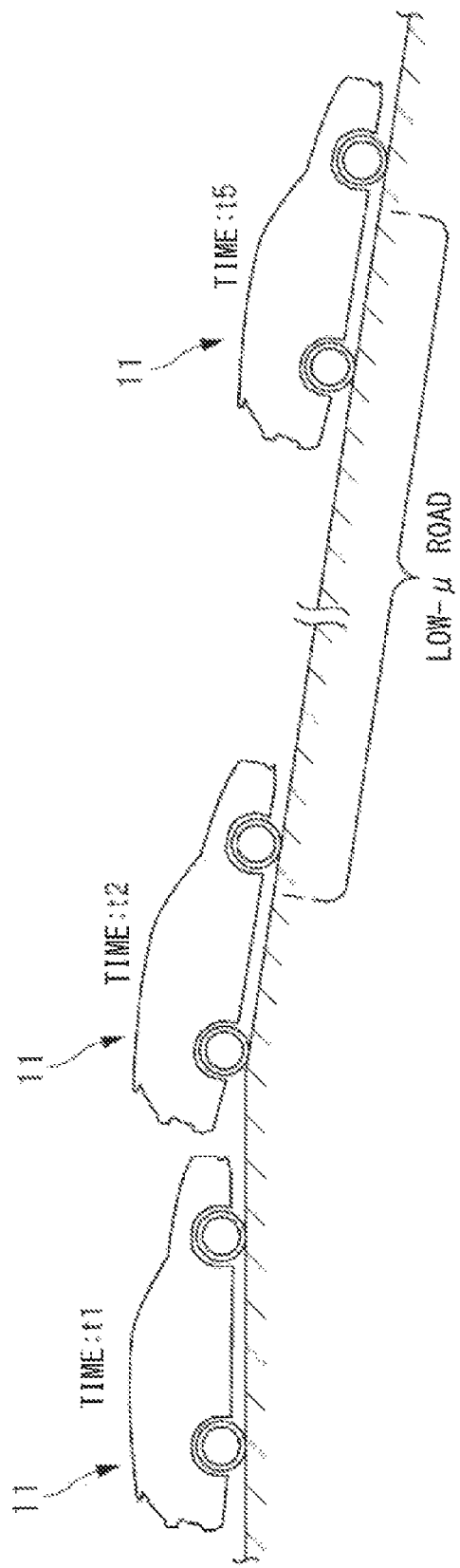
FIG. 12 is a diagram illustrating an example of a coasting situation.
Figure 13:
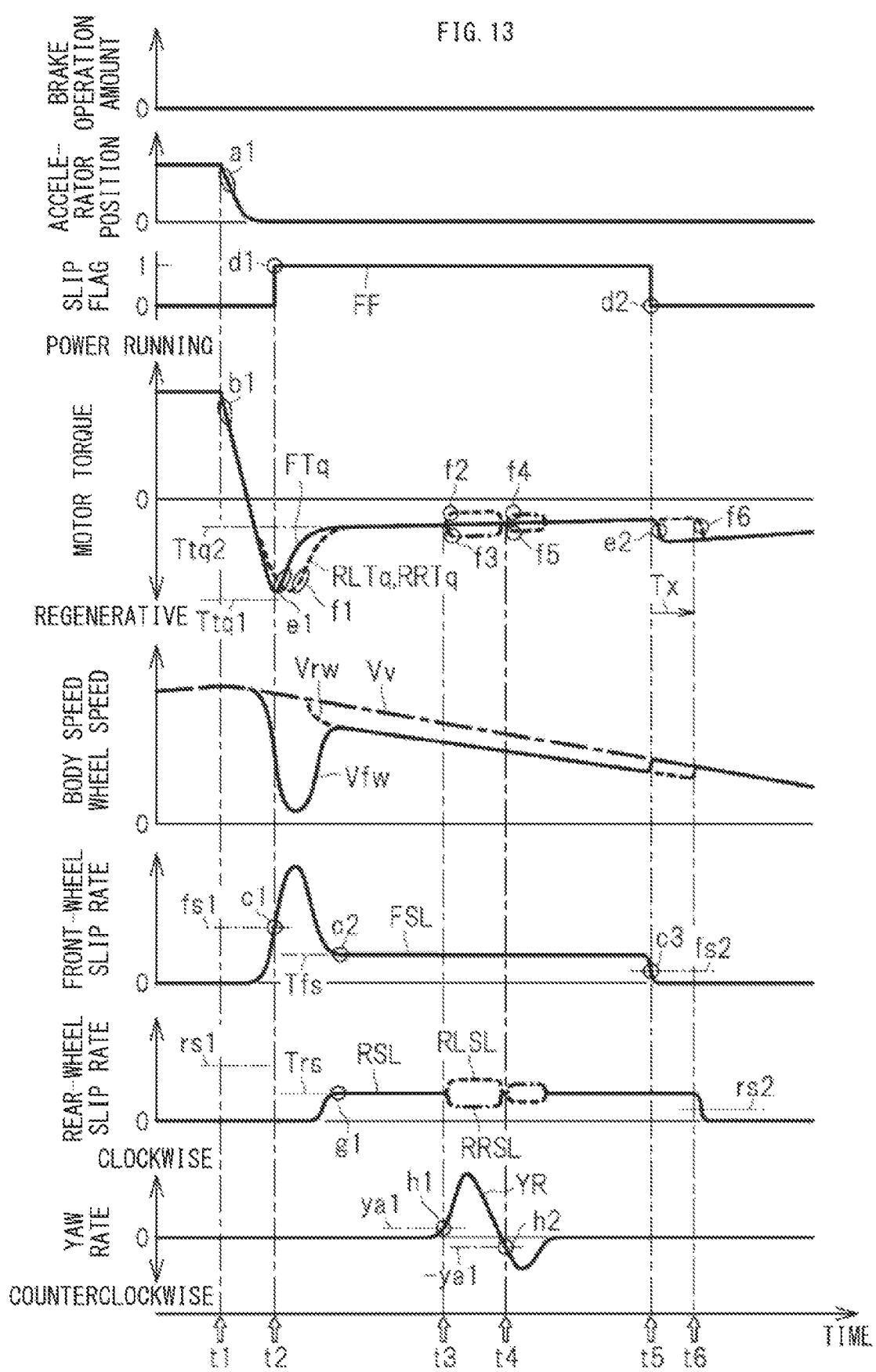
FIG. 13 is a timing chart illustrating an example of an execution situation of a motor torque control.
Figure 14:
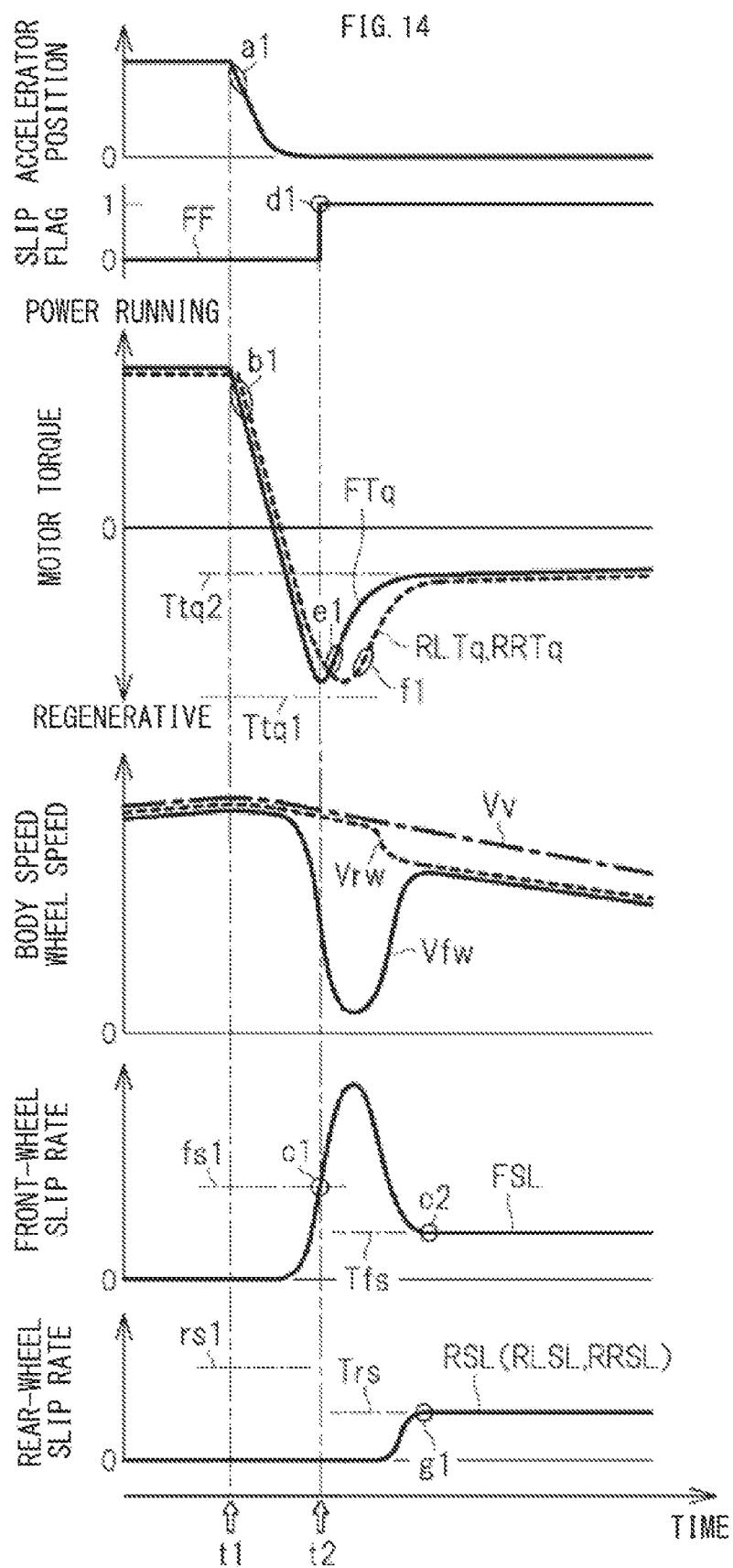
FIG. 14 is a timing chart illustrating a portion of the timing chart of FIG. 13 in an enlarged manner.
Figure 15:
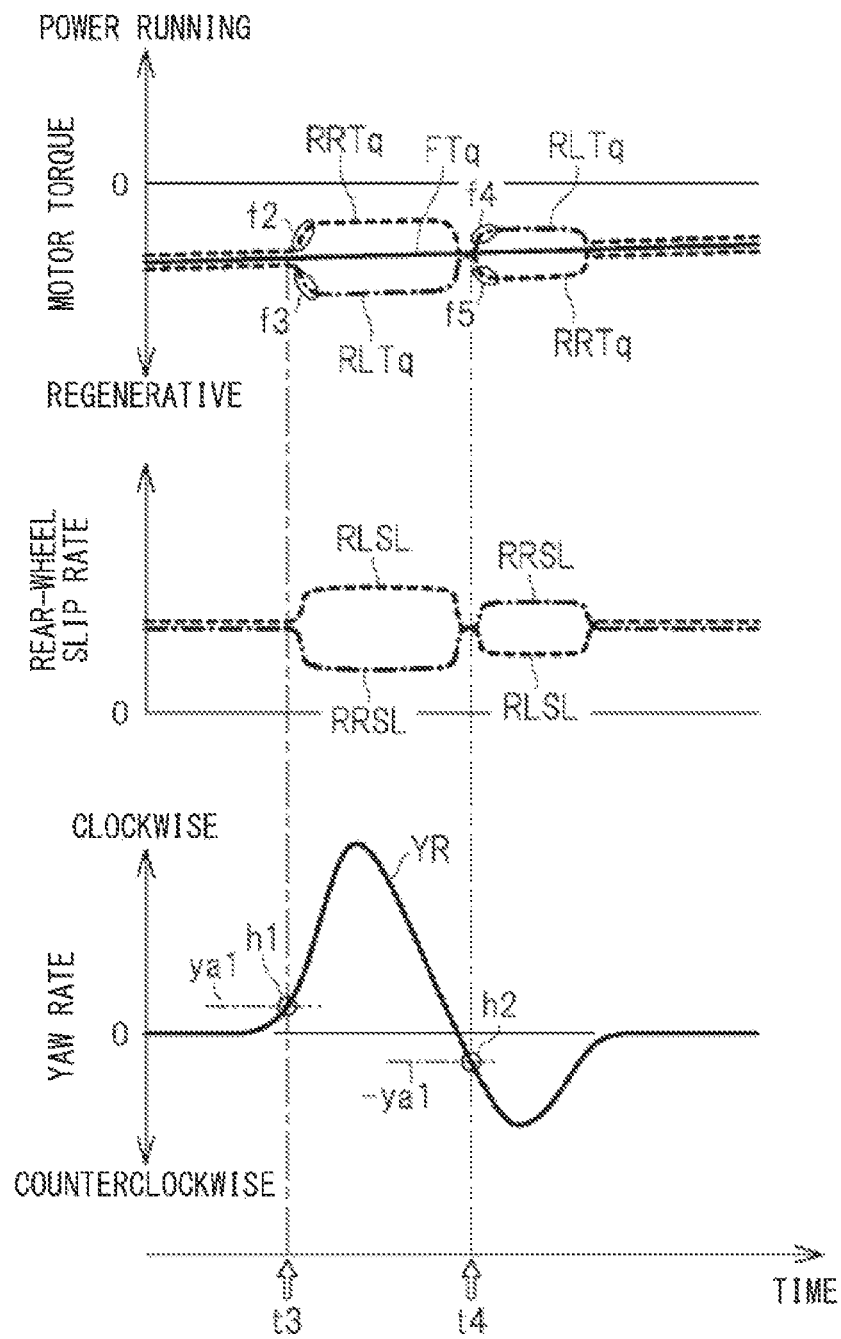
FIG. 15 is a timing chart illustrating a portion of the timing chart of FIG. 13 in an enlarged manner.
Figure 17:
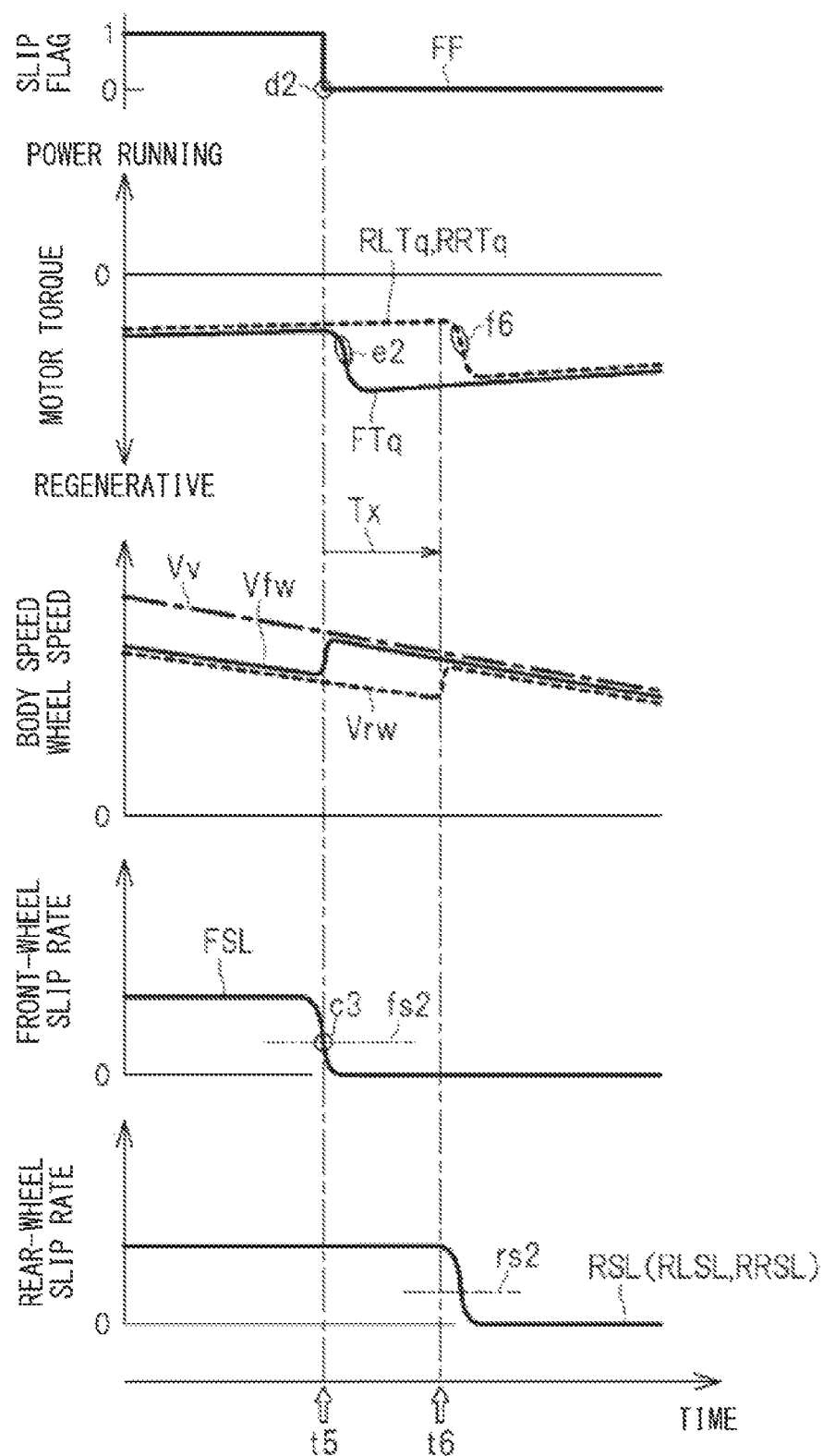
FIG. 17 is a timing chart illustrating a portion of the timing chart of FIG. 13 in an enlarged manner.

An execution situation of the above-described motor torque control is described with reference to a timing chart. FIG. 12 is a diagram illustrating an example of a coasting situation. FIG. 13 is a timing chart illustrating an example of the execution situation of the motor torque control. Further, FIGS. 14 and 15 are each a timing chart illustrating a portion of the timing chart of FIG. 13 in an enlarged manner. FIG. 16 is a diagram illustrating traveling situations of the vehicle 11 at respective times t3 and t4. Further, FIG. 17 is a timing chart illustrating a portion of the timing chart of FIG. 13 in an enlarged manner, and FIG. 18 is a diagram illustrating the traveling situations of the vehicle 11 at respective times t5 and t6.

Times t1 to t6 indicated in FIG. 12 and times t1 to t6 indicated in FIGS. 13 to 18 are the same times, respectively. Further, in FIGS. 13 to 17, "FTq" indicates the motor torque of each of the front motors 14 and 15, "RLTq" indicates the motor torque of the left rear motor 24, and "RRTq" indicates the motor torque of the right rear motor 25. Further, in FIGS. 13 to 15 and 17, "RLSL" indicates the rear-wheel slip rate of the left rear wheel 22L, and "RRSL" indicates the rear-wheel slip rate of the right rear wheel 22R. Further, in FIGS. 13 to 15 and 17, lines that actually overlap each other are slightly shifted from each other in order to make clear transition of the torque, the speed, etc.

<Front-Wheel Slip Suppression Control and Rear-Wheel Slip Suppression Control>

The timing chart illustrated in FIG. 13 describes an execution situation of the motor torque control to be executed in a case where the vehicle 11 coasts on a downhill as illustrated in FIG. 12. In addition, as illustrated in FIG. 12, the downhill on which the vehicle 11 coasts partially includes a section with the low-μ road such as the compacted snow road surface or the frozen road surface.

As illustrated at time t1 in FIGS. 13 and 14, when the depressing of the accelerator pedal is released (reference numeral a1), each of the front motors 14 and 15 and the rear motors 24 and 25 is controlled toward the target regenerative torque Ttq1 set on the regenerative side (reference numeral b1). That is, the motor torque FTq of each of the front motors 14 and 15 is controlled to be on the regenerative side, and each of the motor torque RLTq of the rear motor 24 and the motor torque RRTq of the rear motor 25 is controlled to be on the regenerative side. Hereinafter, the motor torque FTq of each of the front motors 14 and 15 that is controlled to be on the regenerative side is described as front regenerative torque FTq, and the motor torque RLTq of the rear motor 24 and the motor torque RRTq of the rear motor 25 that are controlled to be on the regenerative side are described as rear regenerative torque RLTq and rear regenerative torque RRTq, respectively.

As illustrated at time t2 in FIGS. 13 and 14, when each of the front wheels 12L and 12R entering the low-μ road slips and the front-wheel slip rate FSL becomes greater than the threshold fs1 (reference numeral c1), the front-wheel slip flag FF is set (reference numeral d1), and the initial target torque Ttq2 is set for each of the front motors 14 and 15. Further, the front regenerative torque FTq is controlled toward the initial target torque Ttq2 (reference numeral e1). Thereafter, the front regenerative torque FTq is adjusted on the basis of the front-wheel slip rate FSL, and the front-wheel slip rate FSL converges to the target slip rate Tfs (reference numeral c2). Thus, the control system 40 executes the front-wheel slip suppression control to reduce the front regenerative torque FTq toward the initial target torque Ttq2 in a case where the front-wheel slip rate FSL becomes greater than the threshold fs1.

Further, when the front-wheel slip rate FSL becomes greater than the threshold fs1 (reference numeral c1) and the front-wheel slip flag FF is set (reference numeral d1), the initial target torque Ttq2 is set for each of the rear motors 24 and 25. Further, each of the rear regenerative torque RLTq and the rear regenerative torque RRTq is controlled toward the initial target torque Ttq2 (reference numeral f1). Thereafter, each of the rear regenerative torque RLTq and the rear regenerative torque RRTq is adjusted on the basis of the rear-wheel slip rate RSL, and the rear-wheel slip rate RSL converges to the target slip rate Trs (reference numeral g1). Thus, the control system 40 executes the rear-wheel slip suppression control to reduce each of the rear regenerative torque RLTq and the rear regenerative torque RRTq toward the initial target torque Ttq2 in a case where the front-wheel slip rate FSL becomes greater than the threshold fs1.

As described above, in the case where the front-wheel slip rate FSL becomes greater than the threshold fs1 (reference numeral c1), the front regenerative torque FTq is reduced (reference numeral e1), and in addition, each of the rear regenerative torque RLTq and the rear regenerative torque RRTq is also reduced (reference numeral f1). This makes it possible to suppress the excessive slip of each of the rear wheels 22L and 22R. That is, because each of the rear regenerative torque RLTq and the rear regenerative torque RRTq is reduced (reference numeral f1) before each of the rear wheels 22L and 22R begins to slip excessively, it is possible to cause the rear-wheel slip rate RSL to converge to the target slip rate Trs (reference numeral g1) without greatly increasing the rear-wheel slip rate RSL. As a result, it is possible to suppress the slip of each of the rear wheels 22L and 22R and to stabilize the vehicle attitude even in a situation in which the vehicle 11 enters the low-μ road while coasting.

It is to be noted that the above-described front-wheel slip suppression control corresponds to steps S11 to S15 of the front torque control described with reference to the flowchart of FIG. 5, and the above-described rear-wheel slip suppression control corresponds to steps S41 to S45 of the rear torque control described with reference to the flowchart of FIG. 8. Further, in the description above, the common target regenerative torque Ttq1 is set for the front motors 14 and 15 and the rear motors 24 and 25 and the common initial target torque Ttq2 is also set for them; however, this is non-limiting. That is, the target regenerative torque for each of the front motors 14 and 15 and the target regenerative torque for each of the rear motors 24 and 25 may be different from each other. In addition, the initial target torque for each of the front motors 14 and 15 and the initial target torque for each of the rear motors 24 and 25 may be different from each other.

<Vehicle Attitude Stabilization Control>

As illustrated at time t3 in FIGS. 13 and 15, when the yaw rate YR of the vehicle 11 becomes greater than the threshold ya1 on a clockwise side (reference numeral h1) under the situation in which the rear-wheel slip suppression control has been started, the rear regenerative torque RRTq is reduced from a latest value (reference numeral f2) and the rear regenerative torque RLTq is increased from a latest value (reference numeral f3). That is, as indicated at time t3 in FIG. 16, because a clockwise moment Ma is acting on the vehicle 11 in the situation, the rear regenerative torque RRTq on the right side is reduced and the rear regenerative torque RLTq on the left side is increased. Executing such a vehicle attitude stabilization control makes it possible to generate a moment m1 in a direction to cancel the moment Ma on the vehicle 11, and to thereby return the vehicle attitude from the clockwise rotation state to the straight traveling state.

Further, as illustrated at time t4 in FIGS. 13 and 15, when the yaw rate YR of the vehicle 11 becomes greater than the threshold −ya1 on a counterclockwise side (reference numeral h2) under the situation in which the rear-wheel slip suppression control has been started, the rear regenerative torque RLTq is reduced from a latest value (reference numeral f4) and the rear regenerative torque RRTq is increased from a latest value (reference numeral f5). That is, as indicated at time t4 in FIG. 16, because a counterclockwise moment Mb is acting on the vehicle 11 in the situation, the rear regenerative torque RLTq on the left side is reduced and the rear regenerative torque RRTq on the right side is increased. Executing such a vehicle attitude stabilization control makes it possible to generate a moment m2 in a direction to cancel the moment Mb on the vehicle 11, and to thereby return the vehicle attitude from the counterclockwise rotation state to the straight traveling state.

As described above, in a case where the yaw rate of the vehicle 11 becomes greater than the threshold under the situation where the rear-wheel slip suppression control has been started, the rear regenerative torque RRTq and the rear regenerative torque RLTq are increased and reduced to expand the torque difference between the rear regenerative torque RRTq and the rear regenerative torque RLTq. As described above, even in a case where the rear-wheel slip suppression control is executed following the front-wheel slip suppression control, loads on the rear wheels 22L and 22R tend to be reduced as compared with the front wheels 12L and 12R upon coasting, downhill traveling, etc. Thus, even in a case where braking is similarly performed on the front wheels 12L and 12R and the rear wheels 22L and 22R, the rear wheels 22L and 22R with smaller loads slip more easily. Therefore, the rear regenerative torque RRTq and the rear regenerative torque RLTq are increased and reduced by the vehicle attitude stabilization control. This makes it possible to stabilize a rear portion of the vehicle that is disturbed easily by the slip of the rear wheels 22L and 22R, and to thereby stabilize the vehicle attitude upon coasting.

In the description above, one rear regenerative torque of the right rear regenerative torque RRTq and the left rear regenerative torque RLTq is reduced, and another thereof is increased in the vehicle attitude stabilization control; however, this is non-limiting. For example, one rear regenerative torque of the right rear regenerative torque RRTq and the left rear regenerative torque RLTq may be reduced and the other thereof may be maintained. Alternatively, one rear regenerative torque of the right rear regenerative torque RRTq and the left rear regenerative torque RLTq may be increased and the other thereof may be maintained. In a case where the rear regenerative torque RRTq and the rear regenerative torque RLTq are controlled in such a manner also, it is possible to expand the torque difference between the rear regenerative torque RRTq and the rear regenerative torque RLTq, and to thereby return the vehicle attitude to the straight traveling state. It is to be noted that the increase and reduction amounts of the rear regenerative torque RRTq and the rear regenerative torque RLTq in the vehicle attitude stabilization control may be set on the basis of the magnitude of the yaw rate YR, or may be set on the basis of a variation speed of the yaw rate YR.

<Torque Suppression Cancel Control>

As illustrated at time t5 in FIGS. 13 and 17, when the slip of each of the front wheels 12L and 12R exiting the low-µ road is eliminated and the front-wheel slip rate FSL becomes less than the threshold fs2 (reference numeral c3), the setting of the front-wheel slip flag FF is canceled (reference numeral d2), and the front regenerative torque FTq is controlled toward the target value of the normal control (reference numeral e2). Further, when the front-wheel slip rate FSL becomes less than the threshold fs2 (reference numeral c3), the execution time period Tx is set on the basis of the vehicle speed Vv and the wheel base WB in accordance with Expression (7) described above. Further, as illustrated at time t6, the rear-wheel slip suppression control is ended after the elapse of the execution time period Tx, and each of the rear regenerative torque RRTq and the rear regenerative torque RLTq is controlled toward the target value of the normal control (reference numeral f6).

Here, as described above, the execution time period Tx is the time period obtained by dividing the wheel base WB of the vehicle 11 by the vehicle speed Vv, and is the time period up to the timing when the rear wheels 22L and 22R reach the road surface in contact with the front wheels 12L and 12R. That is, as illustrated at times t5 and t6 in FIG. 18, the time t5 is a timing at which the front wheels 12L and 12R move from the low-µ road to the high-µ road, and the time t6 after the elapse of the execution time period Tx from the time t5 is a timing at which the rear wheels 22L and 22R move from the low-µ road to the high-µ road. As described above, the time t6 after the elapse of the execution time period Tx is an estimated timing at which the rear wheels 22L and 22R are to reach the high-µ road. Therefore, even if it is before the slip of each of the rear wheels 22L and 22R is determined as being eliminated, the timing of elimination of the slip of each of the rear wheels 22L and 22R is estimated using the execution time period Tx to execute the feed-forward control of each of the rear motors 24 and 25. As a result, it is possible to more appropriately control each of the rear regenerative torque RRTq and the rear regenerative torque RLTq.

Other Embodiment 1

Figure 19:
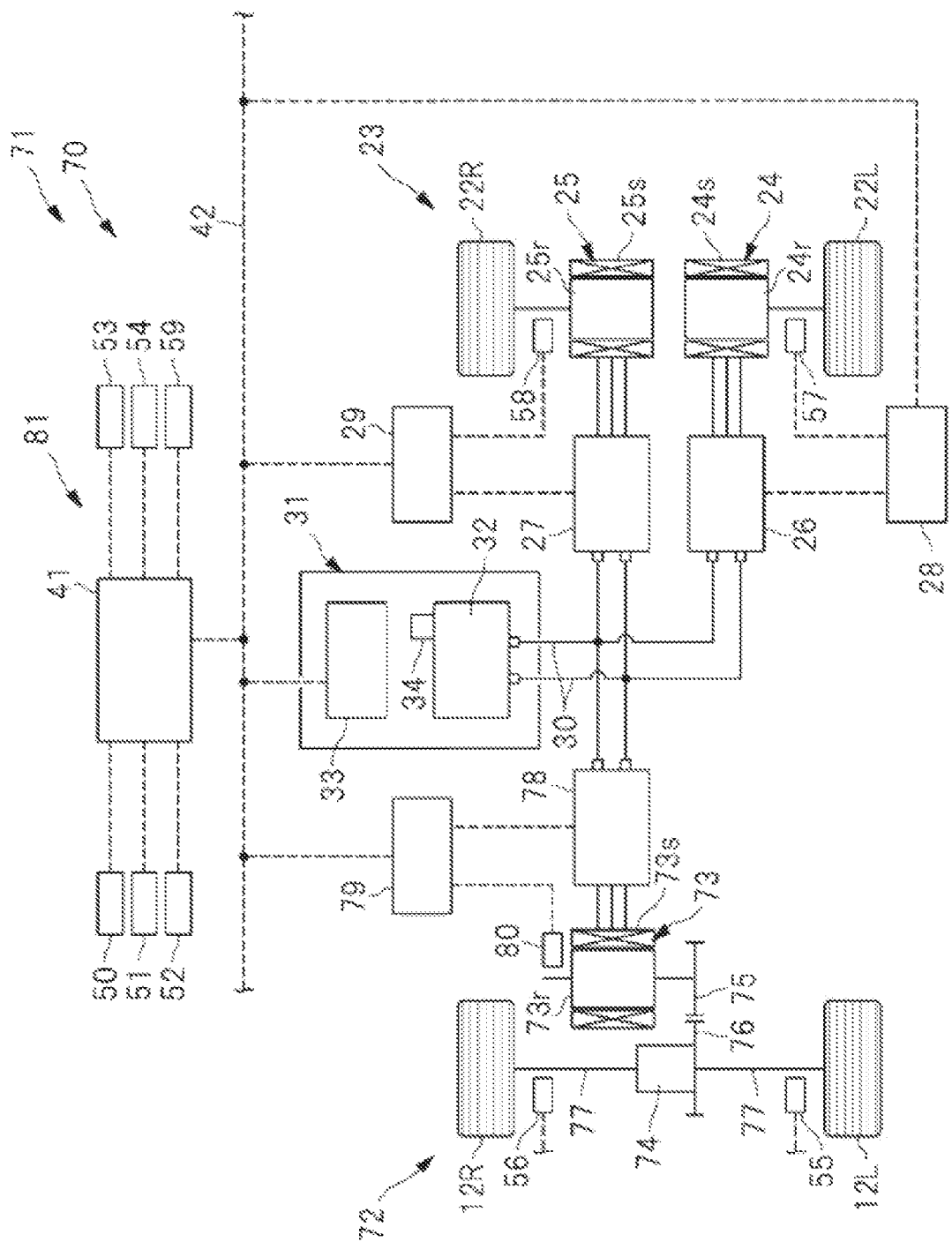
FIG. 19 is a diagram illustrating a configuration example of a vehicle control apparatus according to another embodiment of the invention.

In the description above, the two front motors 14 and 15 are coupled to the front wheels 12L and 12R, respectively; however, this is non-limiting. One front motor may be coupled to the front wheels 12L and 12R. Here, FIG. 19 is a diagram illustrating a configuration example of a vehicle control apparatus 70 according to another embodiment of the invention. In FIG. 19, the configurations similar to those illustrated in FIG. 2 are denoted by the same reference numerals, and a description thereof is omitted.

As illustrated in FIG. 19, a vehicle 71 is provided with a front-wheel drive system 72 that drives the left front wheel 12L and the right front wheel 12R. The front-wheel drive system 72 includes a front motor (a front-wheel motor) 73 and a front differential 74. A driving gear 75 is coupled to a rotor 73r of the front motor 73, and a driven gear 76 fixed to the front differential 74 is meshed with the driving gear 75. In addition, the front wheels 12L and 12R are coupled to an axle 77 extending from the front differential 74.

An inverter 78 is coupled to a stator 73s of the front motor 73, and the battery pack 31 is coupled to the inverter 78. Further, a front control unit 79 is coupled to the inverter 78 in order to control the front motor 73 via the inverter 78. Coupled to the front control unit 79 is a rotation sensor 80 such as a resolver that detects a rotation speed of the rotor 73r. Further, the front control unit 79 and the above-described control units 28, 29, 33, and 41 form a control system 81 that controls the front-wheel drive system 72 and the rear-wheel drive system 23.

In the above-described case where the front-wheel drive system 72 included in the vehicle control apparatus 70 includes the single front motor 73 coupled to the left front wheel 12L and the right front wheel 12R also, it is possible to achieve functions in a manner similar to those of the vehicle control apparatus 10 described above. That is, it is possible to stabilize the vehicle attitude upon coasting by executing the motor torque control upon coasting described above.

Other Embodiment 2

Figure 20:
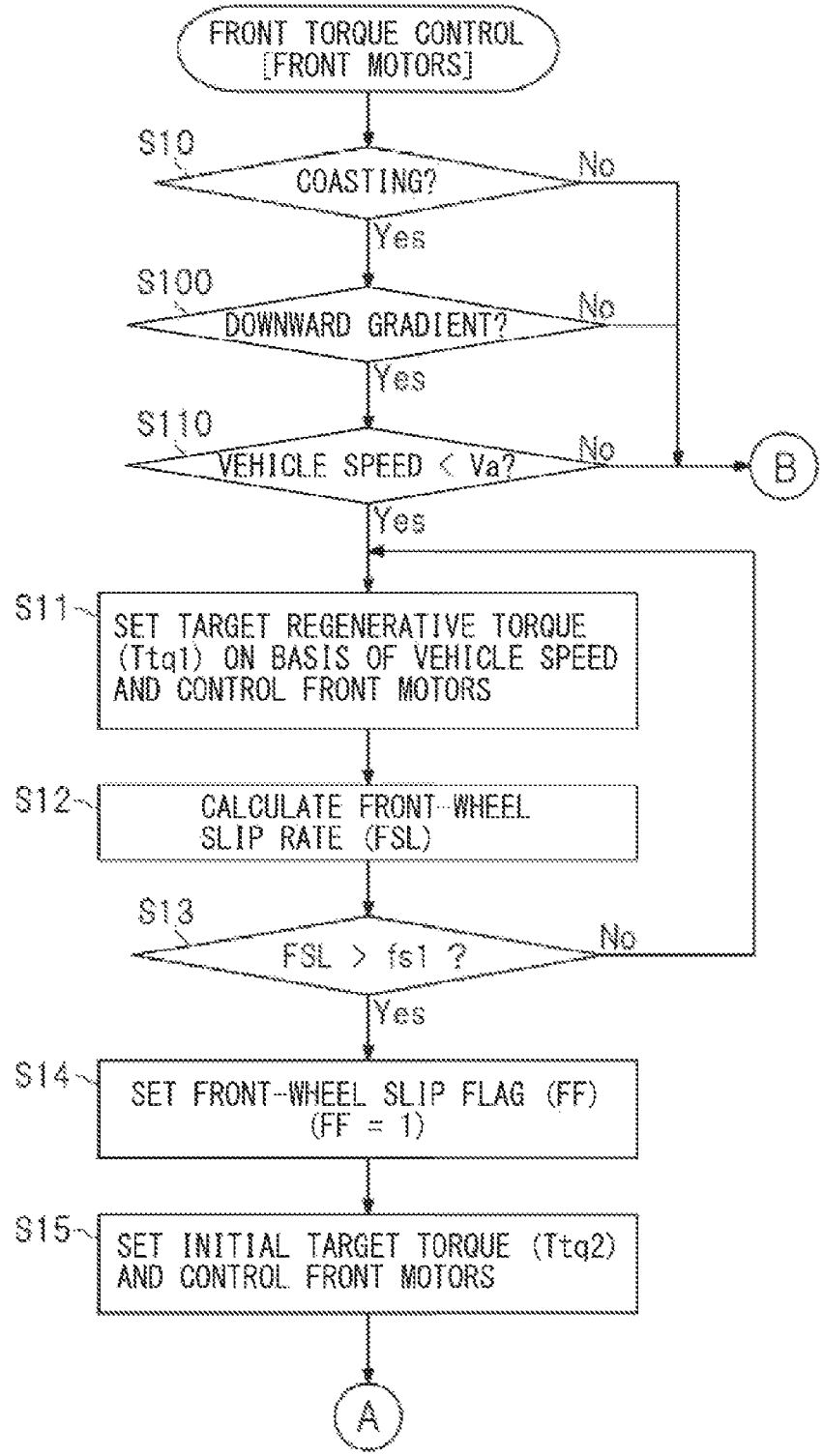
FIG. 20 is a flowchart illustrating another execution procedure of the front torque control.
Figure 21:
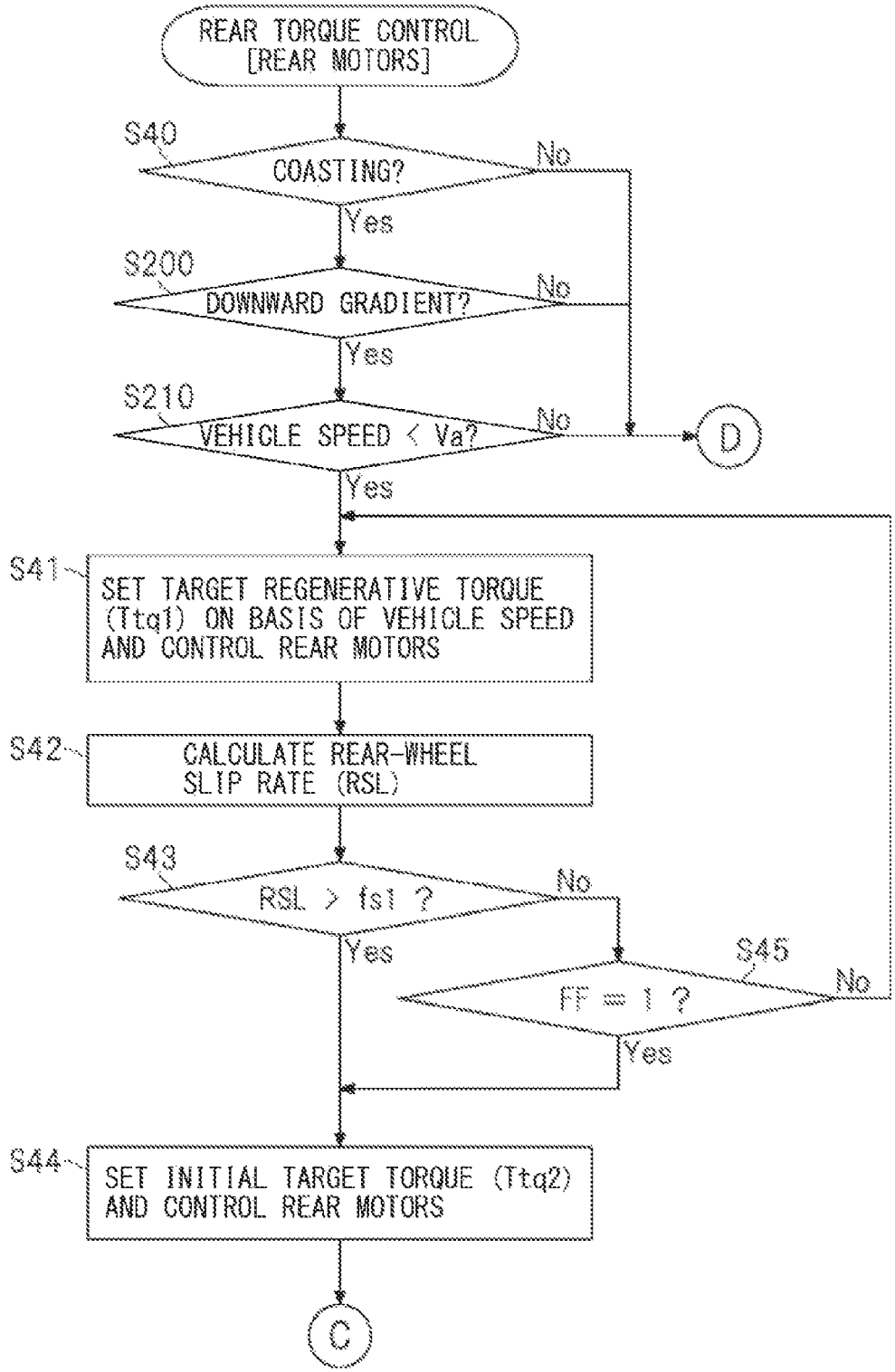
FIG. 21 is a flowchart illustrating another execution procedure of the rear torque control.

In the front torque control illustrated in FIG. 5 and the rear torque control illustrated in FIG. 8, the front-wheel slip suppression control or the rear-wheel slip suppression control is started after determining whether coasting is performed; however, this is non-limiting. Here, FIG. 20 is a flowchart illustrating another execution procedure of the front torque control, and FIG. 21 is a flowchart illustrating another execution procedure of the rear torque control. It is to be noted that in FIG. 20, steps similar to those described in FIG. 5 are denoted by the same reference numerals, and descriptions thereof are omitted. In addition, in FIG. 21, steps similar to those described in FIG. 8 are denoted by the same reference numerals, and descriptions thereof are omitted.

As illustrated in FIG. 20, in step S10, it is determined whether or not coasting is performed in which the accelerator operation and the brake operation are not performed. If it is determined that the coasting is performed in step S10, the process proceeds to step S100, in which it is determined whether or not the road surface gradient of the traveling road surface is a downward gradient. If the traveling road surface is determined as having the downward gradient in step S100, the process proceeds to step S110, in which it is determined whether or not the vehicle speed is in a low vehicle speed range that is lower than a predetermined value Va. If the vehicle speed is determined as being lower than the predetermined value Va in step S110, the process proceeds to step S11, in which the target regenerative torque Ttq1 is set on the basis of the vehicle speed, and the regenerative torque of each of the front motors 14 and 15 is controlled on the basis of the set target regenerative torque Ttq1.

Further, as illustrated in FIG. 21, in step S40, it is determined whether or not coasting is performed in which the accelerator operation and the brake operation are not performed. If it is determined that the coasting is performed in step S40, the process proceeds to step S200, in which it is determined whether or not the road surface gradient of the traveling road surface is a downward gradient. If the traveling road surface is determined as having the downward gradient in step S200, the process proceeds to step S210, in which it is determined whether or not the vehicle speed is in the low vehicle speed range that is lower than the predetermined value Va. If the vehicle speed is determined as being lower than the predetermined value Va in step S210, the process proceeds to step S41, in which the target regenerative torque Ttq1 is set on the basis of the vehicle speed, and the regenerative torque of each of the rear motors 24 and 25 is controlled on the basis of the target regenerative torque Ttq1.

Thus, the front-wheel slip suppression control, the rear-wheel slip suppression control, and the attitude stabilization control described above are executed under a situation in which the traveling road surface upon coasting has the downward gradient. This makes it possible to execute the motor torque control upon coasting and to thereby stabilize the vehicle attitude upon coasting in a case of the downward gradient in which the loads of the rear wheels 22L and 22R easily decrease. It is to be noted that the vehicle control unit 41 is able to calculate the road surface gradient of the traveling road surface with use of the detected information of the acceleration sensor 52. In addition, the front-wheel slip suppression control, the rear-wheel slip suppression control, and the attitude stabilization control described above are executed under a situation in which the vehicle speed upon coasting is lower than the predetermined value Va. Thus, it is possible to stabilize the vehicle attitude upon coasting in the low vehicle speed range. It is to be noted that in the examples illustrated in FIGS. 20 and 21, it is determined whether or not the road surface gradient is the downward gradient, and it is also determined whether or not the vehicle speed is lower than the predetermined value Va; however, this is non-limiting. Only whether or not the road surface gradient is the downward gradient may be determined, or only whether or not the vehicle speed is lower than the predetermined value Va may be determined.

It is needless to say that the invention is not limited to the embodiments described above, and various modifications can be made within a range not departing from the gist thereof. In the description above, the control system 40 includes the plurality of control units 18, 19, 28, 29, 33, and 41; however, this is non-limiting. For example, the control system 40 may include a single control unit. It is to be noted that the vehicle 11 is not limited to the electric vehicle illustrated in the drawings. The vehicle 11 may be a fuel cell electric vehicle, or may be a series hybrid electric vehicle. In addition, in the description above, the body speed Vv is used as the vehicle speed; however, this is non-limiting. The wheel speed Vfw may be used as the vehicle speed, or the wheel speed Vrw may be used as the vehicle speed.

DESCRIPTION OF REFERENCE NUMERALS

10 Vehicle control apparatus
11 Vehicle
12L Left front wheel (Front wheel)
12R Right front wheel (Front wheel)
13 Front-wheel drive system
14 Left front motor (Front-wheel motor)
15 Right front motor (Front-wheel motor)
22L Left rear wheel (Rear wheel)
22R Right rear wheel (Rear wheel)
23 Rear-wheel drive system
24 Left rear motor (Rear-wheel motor)
25 Right rear motor (Rear-wheel motor)
40 Control system
60 Processor
61 Memory
70 Vehicle control apparatus
71 Vehicle
72 Front-wheel drive system
73 Front motor (Front-wheel motor)
81 Control system
FSL Front-wheel slip rate
Fs1 Threshold (Start threshold)
Fs2 Threshold (End threshold)
Tfs Target slip rate (Front-wheel target value)
Ttq2 Initial target torque (Initial front-wheel torque. Initial rear-wheel torque)
YR Yaw rate
ya1, −ya1 Threshold (Behavior determination threshold)
Body speed (Vehicle speed)

The invention claimed is:
1. A vehicle control apparatus to be mounted on a vehicle, the vehicle control apparatus comprising:
a front-wheel drive system including one or two front-wheel motors each coupled to a front wheel;

a rear-wheel drive system including two rear-wheel motors each coupled to a rear wheel; and a control system including a processor and a memory communicably coupled to each other, the control system being configured to control the front-wheel drive system and the rear-wheel drive system, wherein, in a case where a front-wheel slip rate is greater than a start threshold upon coasting, the control system executes a front-wheel slip suppression control of reducing regenerative torque of each of the one or two front-wheel motors toward an initial front-wheel torque, in the case where the front-wheel slip rate is greater than the start threshold upon the coasting, the control system executes a rear-wheel slip suppression control of reducing regenerative torque of each of the rear-wheel motors toward an initial rear-wheel torque, and in a case where a yaw rate of the vehicle is greater than a behavior determination threshold under a situation in which the rear-wheel slip suppression control has been started, the control system executes an attitude stabilization control of controlling the regenerative torque of at least one of the two rear-wheel motors positioned on left and right sides of the vehicle and thereby expanding a difference in the regenerative torque between the two rear-wheel motors.

2. The vehicle control apparatus according to claim 1, wherein, in a case where the front-wheel slip rate is less than an end threshold under a situation in which the rear-wheel slip suppression control is being executed, the control system ends the rear-wheel slip suppression control after an elapse of an execution time period, the end threshold being less than the start threshold, the execution time period being set on a basis of a vehicle speed.

3. The vehicle control apparatus according to claim 1, wherein, in the front-wheel slip suppression control, the control system adjusts the regenerative torque of each of the one or two front-wheel motors and thereby causes the front-wheel slip rate to converge to a front-wheel target value after reducing the regenerative torque of each of the one or two front-wheel motors toward the initial front-wheel torque, and in the rear-wheel slip suppression control, the control system adjusts the regenerative torque of each of the rear-wheel motors and thereby causes a rear-wheel slip rate to converge to a rear-wheel target value after reducing the regenerative torque of each of the rear-wheel motors toward the initial rear-wheel torque.

4. The vehicle control apparatus according to claim 1, wherein, in the attitude stabilization control, the control system reduces a value of the regenerative torque of one of the two rear-wheel motors and increases a value of the regenerative torque of another of the two rear-wheel motors.

5. The vehicle control apparatus according to claim 1, wherein the control system executes the front-wheel slip suppression control, the rear-wheel slip suppression control, and the attitude stabilization control under a situation in which a traveling road surface has a downward gradient.

6. The vehicle control apparatus according to claim 1, wherein the control system executes the front-wheel slip suppression control, the rear-wheel slip suppression control, and the attitude stabilization control under a situation where a vehicle speed is lower than a predetermined value.

* * * * *